United States Patent
Carrasco Zanini et al.

(10) Patent No.: US 10,451,222 B2
(45) Date of Patent: Oct. 22, 2019

(54) MAGNETIC CRAWLER VEHICLE WITH PASSIVE REAR-FACING APPARATUS

(71) Applicant: Saudi Arabian Oil Company, Dhahran (SA)

(72) Inventors: Pablo Carrasco Zanini, Thuwal (SA); Fadl Abdellatif, Thuwal (SA); Brian Parrott, Thuwal (SA); Ali Outa, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 39 days.

(21) Appl. No.: 15/647,372

(22) Filed: Jul. 12, 2017

(65) Prior Publication Data

US 2019/0017656 A1     Jan. 17, 2019

(51) Int. Cl.
*F17D 5/06*     (2006.01)
*B60B 19/00*    (2006.01)
(Continued)

(52) U.S. Cl.
CPC ............. *F17D 5/06* (2013.01); *B60B 19/006* (2013.01); *B62D 53/02* (2013.01); *B62D 57/024* (2013.01); *B62D 61/02* (2013.01)

(58) Field of Classification Search
CPC ................................ B60B 19/006; F17D 5/06
(Continued)

(56) References Cited

U.S. PATENT DOCUMENTS

| | | |
|---|---|---|
| 3,465,843 A | 9/1969 | Guinot |
| 3,872,940 A | 3/1975 | Gambini |

(Continued)

FOREIGN PATENT DOCUMENTS

| | | |
|---|---|---|
| CN | 102421571 A | 4/2012 |
| CN | 102673673 A | 9/2012 |

(Continued)

OTHER PUBLICATIONS

International Search Report and Written Opinion for corresponding International Patent Application No. PCT/US2018/041058 dated Oct. 24, 2018. 15 pages.
(Continued)

*Primary Examiner* — Joseph M Rocca
*Assistant Examiner* — Felicia L. Brittman
(74) *Attorney, Agent, or Firm* — Leason Ellis LLP

(57) ABSTRACT

A robotic vehicle for traversing surfaces is provided. The vehicle is comprised of a front chassis section including a magnetic drive wheel for driving and steering the vehicle and a front support point configured to contact the surface. The vehicle also includes a rear chassis section supporting a follower wheel. The front and rear chassis sections are connected by joints including a hinge joint and a four-bar linkage. The hinge is configured to allow the trailing assembly to move side-to-side while the four-bar linkage allows the trailing assembly to move up and down relative to the front chassis. Collectively, the rear facing mechanism is configured to maintain the follower wheel in contact with and normal to the surface and also maintains the front support in contact with the surface and provides stability and maneuverability to the vehicle while traversing surfaces regardless of surface curvature and vehicle orientation.

18 Claims, 15 Drawing Sheets

(51) Int. Cl.
B62D 53/02 (2006.01)
B62D 57/024 (2006.01)
B62D 61/02 (2006.01)

(58) Field of Classification Search
USPC ............................................... 180/15
See application file for complete search history.

(56) References Cited

U.S. PATENT DOCUMENTS

| | | | |
|---|---|---|---|
| 4,715,460 | A | 12/1987 | Smith |
| 4,722,001 | A | 1/1988 | Rohrich et al. |
| 4,995,320 | A | 2/1991 | Tomoaki et al. |
| 5,375,530 | A | 12/1994 | Zollinger et al. |
| 5,423,230 | A | 6/1995 | Olander et al. |
| 6,315,109 | B1 | 11/2001 | Dean |
| 7,210,364 | B2 | 5/2007 | Ghorbel et al. |
| 8,605,145 | B2 | 12/2013 | Webster et al. |
| 9,360,311 | B2 | 6/2016 | Gonzalez et al. |
| 9,540,179 | B2 * | 1/2017 | Yang .................. H02G 1/04 |
| 2007/0137905 | A1 * | 6/2007 | Lee ..................... B25J 5/007 180/21 |
| 2008/0092672 | A1 | 4/2008 | Gibson et al. |
| 2008/0295595 | A1 | 12/2008 | Tacklind et al. |
| 2011/0169938 | A1 | 7/2011 | Webster et al. |
| 2013/0024067 | A1 | 1/2013 | Troy et al. |
| 2013/0140801 | A1 * | 6/2013 | Schlee .................. B60B 39/00 280/762 |
| 2014/0278221 | A1 | 9/2014 | Troy et al. |
| 2015/0151572 | A1 | 6/2015 | Parrott et al. |
| 2015/0153170 | A1 | 6/2015 | Gonzalez et al. |
| 2015/0153312 | A1 | 6/2015 | Gonzalez et al. |
| 2016/0238565 | A1 * | 8/2016 | Gonzalez ........... G01N 29/2487 |

FOREIGN PATENT DOCUMENTS

| | | | |
|---|---|---|---|
| CN | 202622792 U | | 12/2012 |
| CN | 202624434 U | | 12/2012 |
| CN | 103085902 A | * | 5/2013 |
| CN | 103171640 A | | 6/2013 |
| CN | 105197156 A | * | 12/2015 |
| EP | 2197731 B1 | | 9/2011 |
| JP | S54131209 A | | 10/1979 |
| JP | S62268782 A | | 11/1987 |
| JP | 02120168 | | 5/1990 |
| JP | 2000052282 A | | 2/2000 |
| KR | 100855521 B1 | | 9/2008 |
| KR | 20120118070 A | | 10/2012 |
| KR | 20130025690 A | | 3/2013 |
| WO | 0179007 A1 | | 10/2001 |
| WO | 2014076806 A1 | | 5/2014 |
| WO | 2016144627 A1 | | 9/2016 |
| WO | WO-2016144627 A1 * | 9/2016 | .............. H02J 50/10 |

OTHER PUBLICATIONS

Cegla et al. "High-temperature (>500° C.) wa 11 thickness monitoring using dry-coupled ultrasonic waveguide transducers." IEEE Tran sa cti ons on Ultrasonics, Ferroelectrics and Frequency Control, IEEE, US, vol. 58, No. 1, Jan. 1, 2011 (Jan. 1, 2011), pp. 156-167, XP011343740, ISSN: 0885-3010, DOI: 10.1109/TUFFC.2011.1782.
Hillenbrand et al. "Cromsci: Climbing Robot with Multiple Sucking Chambers for Inspection Tasks." CROMSCI. Jun. 18, 2008. Web. <agrosy.informatik.uni-kl.de/en/robots/cromsci/>. pp. 1-8.
International Preliminary Report on Patentability for International Patent Application No. PCT/US2014/067490 dated May 31, 2016. 7 pages.
International Search Report and Written Opinion for International Patent Application No. PCT/US2014/067490 dated Mar. 27, 2015. 14 pages.
International Search Report and Written Opinion for International Patent Application No. PCT/US2014/067494 dated May 20, 2015. 12 pages.
Kentarou et al. "Advanced pipe inspection robot using rotating probe." The Fifteenth International Symposium on Artificial Life and Robotics. Feb. 4-6, 2010. pp. 573-576.
Lee, S. H. et al. "Recognition of corrosion state based on omnidirectional mobile robot for inspection of CAS for oil tanker." 2008 SICE Annual Conference, Tokyo, 2008, pp. 155-159. doi: 10.1109/SICE.2008.4654640.
Leon-Rodriguez et al. "A compact wall-climbing and surface adaptation robot for non-destructive testing." Control, Automation and Systems (ICCAS), 2012 12th International Conference IEEE, Oct. 17, 2012 (Oct. 17, 2012), pp. 404-409, XP032291825, ISBN: 978-1-4673-2247-8.
Luk et al. "Intelligent Legged Climbing Service Robot for Remote Maintenance Applications in Hazardous Environments", Robotics and Autonomous Systems, vol. 53, Issue 2, Nov. 30, 2005. pp. 1-14.
No Author. "Advanced Environmental Technologies." Robotics and Inspection Services. 2008. Web. Sep. 24, 2014. <http://www.aettopgun.com/pipe.html> 1 page.
No Author. "CamOnWheels." CamOnWheels RSS. Web. Sep. 23, 2014. <http://www.camonwheels.com/>. pp. 1-2.
No Author. "CCNY Robotics Professor Receives NSF Commercialization Grant." The City College of New York, Apr. 4, 2012. Web. <www.ccny.cuny.edu/news/CCNY-Robotics-Professor-Receives-NSF-Commercialization-Grant.cfm>. 2 pages.
No Author. ECOVACS. "An robotic window cleaner for your needs." Copyright 2012. Web. <www.ecovacs.com.cn/Winbot/home.htm>. 4 pages.
No Author. Honda Worldwide. "Honda Announces New UNI-CUB Personal Mobility Device Designed for Harmony with People. Joint demonstration testing to begin in June." Honda Motor Co., Ltd. 2017. Published May 15, 2012. Accesed via Web on Aug. 3, 2017. <http://world.honda.com/news/2012/c120515eng.html>.
No Author. "HR-MP5 Features." Light Weight Magnetic Climbing Robot. Web. 2010-2014. 2 pages.
No Author. "Hydroblasting Robot." Mechanical Equipment—Hydroblasting Robot. 2009. Web. <www.ahilios.gr/en/mechanical-equipment/hydroblasting-robot.html>. 1 page.
No Author. LEGO Mindstorms Robots. "Using a Rotacaster Omniwheel as a Steering Jockey-Wheel for Lego NXT." YouTube video https://youtu.be/gWDmUmGJxyE. Published Sep. 21, 2010. 1 page.
No Author. "Pipe Wheels." DH Casters Wheels. Web. Sep. 23, 2014. <http://www.dhcasters.com/pipe-wheels-p-1032-l-en.html> 2 pages.
No Author. "ROCR Is an Oscillating Climbing Robot." ClimbingRobots: ROCR. May 13, 2012. Web. <heml.eng.utah.edu/index.php/ClimbingRobots/ROCR>. pp. 1-5.
No Author. "SERBOT AG—Solar Panel Cleaning and Facade Cleaning Systems." SERBOT Swiss Innovations, Copyright 2015. Web. <www.serbot.ch/index.php/en/>. 6 pages.
No Author. "Shady." DRL. N.p., Aug. 19, 2010. Web. <groups.csail.mit.edu/drl/wiki/index.php?title=Shady#Linkage-Based_Grip_Mechanism>. 4 pages.
No Author. "Solid Polymer Converyor Rollers." Power-Core. Web. Sep. 23, 2014. <http://www.intechpower.com/products/solid-polymer-conveyor-rollers-/>. pp. 1-2.
No Author. "Stainless Steel V-Groove Wheel Casters W-313-SVB-1/2." Hamilton. Web. Sep. 23, 2014. <http://www.hamiltoncaster.com/Casters/Stainless_Steel_Casters/Stainles> 2 pages.
No Author. "V Groove Caster Wheels." Caster City. Web. Sep. 23, 2014. <http://www.castercity.com/vgroovew.htm> 3 pages.
No Author. "Internal Inspection of Small Pipes; PIPETRON." HiBot Corporation. Grren Innovations Jetro Partnerships. 2005-2012.
No Author. Oddbot. "Service Droid—The Build." Service Droid—The Build Let's Make Robots. Sep. 7, 2013. Web. Oct. 4, 2013. pp. 1-7. <http://letsmakerobots.com/node/38376?page=1>.
No Author. "Pipe Handling Conveyors." Cisco-Eagle. Web. Sep. 23, 2014. <http://www.cisco-eagle.com/catalog/c-3278-pipe-handling-conveyor.aspx> 4 pages.
Park et al. "Design of a mobile robot system for automatic integrity evaluation of large size reservoirs and pipelines in industrial fields." Proceedings of the 2003 IEEE/RSJ International Conference on

(56) References Cited

OTHER PUBLICATIONS

Intelligent Robots and Systems. (IROS 2003). Las Vegas, NV, Oct. 27-31, 2003; [IEEE/RSJ International Conference on Intelligent Robots and Systems], New York, NY: IEEE, US, vol. 3, Oct. 27, 2003 (Oct. 27, 2003), pp. 2618-2623, XP010675570, DOI: 10.1109/IROS.2003.1249265, ISBN: 978-0-7803-7860-5.

Tâche et al. "Adapted Magnetic Wheel Unit for Compact Robots Inspecting Complex Shaped Pipe Structures." Advanced intelligent mechatronics, 2007 IEEE/ASME international conference. pp. 1-6.

Tâche et al. "Compact Magnetic Wheeled Robot With High Mobility for Inspecting Complex Shaped Pipe Structures." pp. 1-6.

Tâche. "Magnebike: A Magnetic Wheeled Robot With High Mobility for Inspecting Complex Shaped Structures." Article first published online: Mar. 6, 2009. pp. 1-33.

Tâche et al. "Magnebike: Compact Magnetic Wheeled Robot." Autonomous Systems Lab. 1 page.

White et al. "The design and operational performance of a climbing robot used for weld inspection in hazardous environments." Control Applications, 1998. Proceedings of the 1998 IEEE International Conference on Trieste, Italy Sep. 1-4, 1998, New York, NY, USA,IEEE, US, vol. 1, Sep. 1, 1998 (Sep. 1, 1998), pp. 451-455, XP010307364, DOI: 10.1109/CCA.1998.728489, ISBN: 978-0-7803-4104-3.

Yi et al. "Development of a wall climbing robot for ship rust removal", Mechatronics and Automation, ICMA Aug. 2009. International Conference. Abstract. 6 pages.

Zanini. "Comparative Survey of Climbing Robot Mechanisms for Vessel and Tank Inspection", 6th Middle East NDT Conference & Exhibition 2012—[Oct. 7-10, 2012, Kingdom of Bahrain], pp. 1-8.

\* cited by examiner

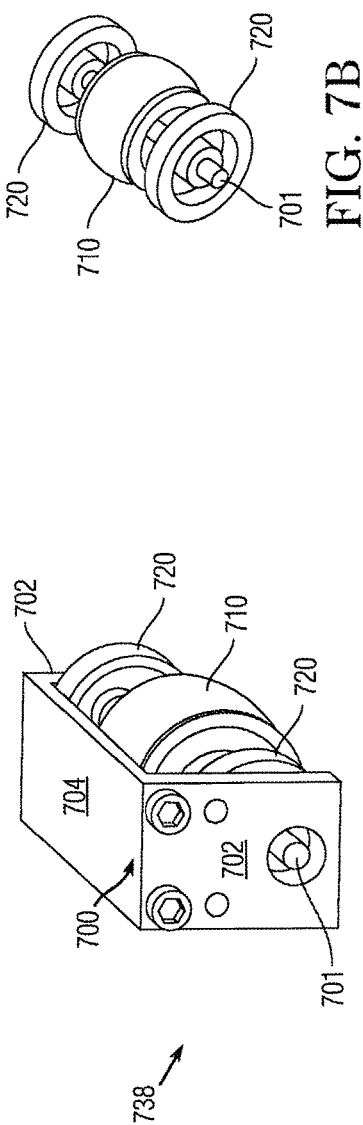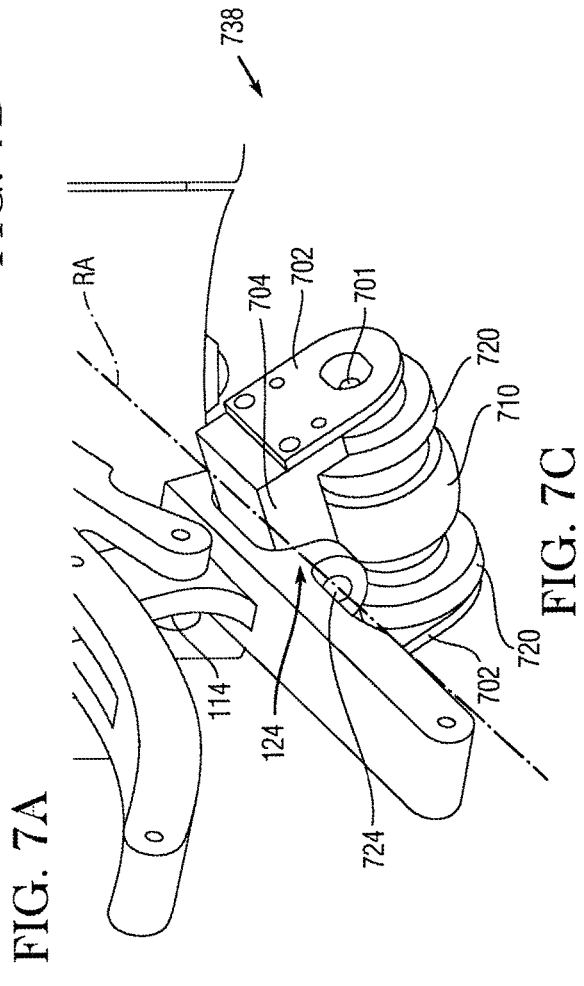
FIG. 7A
FIG. 7B
FIG. 7C

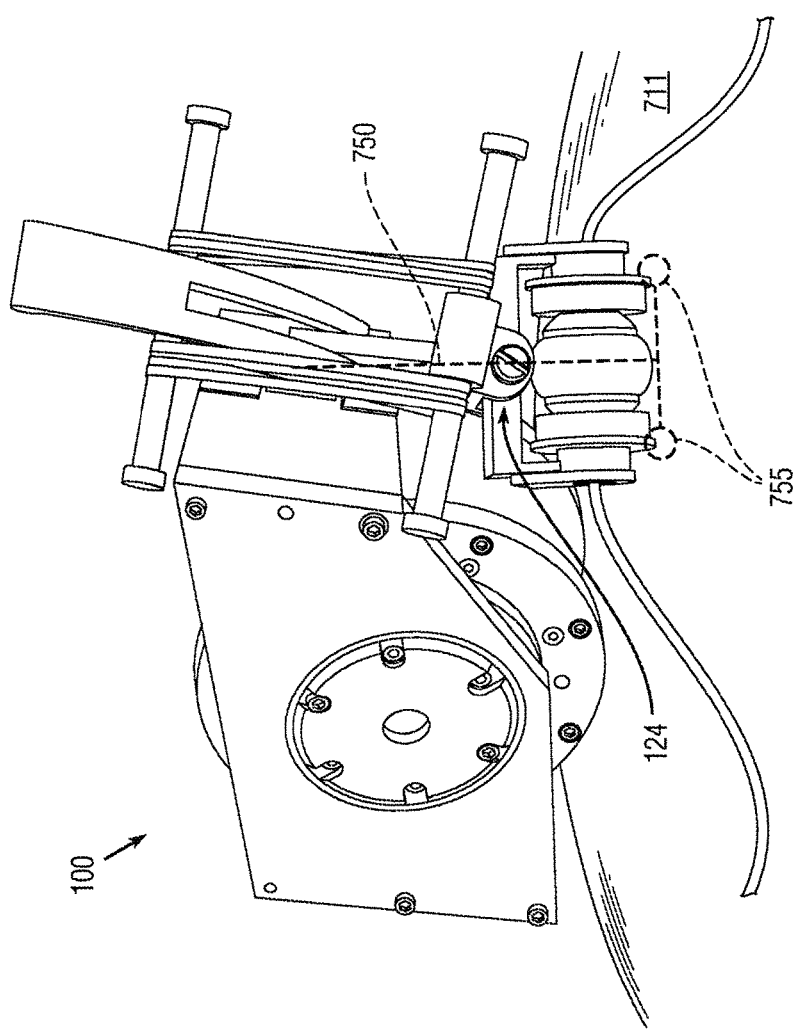

MAGNETIC CRAWLER VEHICLE WITH PASSIVE REAR-FACING APPARATUS

FIELD OF THE INVENTION

The present invention relates to robotic vehicles and, in particular, robotic inspection vehicles having an in-line wheel configuration.

BACKGROUND OF THE INVENTION

Routine inspection of equipment is critical in most industries in order to ensure safety and optimize performance. For example, in the petroleum industry and related fields, liquids and gases and mixtures thereof are transported via pipelines and these materials are also stored in large tanks.

It is known in this industry that in order to maintain the integrity of pipelines, storage tanks and the like, a sensor device can be employed to inspect such surfaces. In particular, an inspection vehicle can be used to travel across a surface of the target object (e.g., a pipe or tank) and record information about the quality of the pipe wall. A majority of these inspection vehicles use ultrasonic or magnetic sensors to carry out the inspection. Based on the recorded information, any cracks or other deficiencies in the surface being inspected (e.g., pipe wall) can be detected and noted to allow for subsequent remedial action to be taken.

In the past, there have been different inspection vehicle designs that are used to inspect various structures, such as factory equipment, ships, underwater platforms, pipelines and storage tanks. If a suitable inspection vehicle is not available to inspect the structure, an alternative is to build scaffolding that will allow people access to inspect these structures, but at great cost and danger to the physical safety of the inspectors. Past inspection vehicles have lacked the control necessary to inspect such surfaces effectively.

In addition, while there are a number of different sensors that can be used in such inspection vehicles, one preferred type of ultrasonic sensor is a dry coupled probe (DCP) that is configured to perform ultrasonic inspection of the surface to measure wall thickness and detect corrosion. Dry coupled probes are typically built in the form of a wheel in which a shaft (axle) is meant to be held fixed since the shaft has the transducer component rigidly embedded in it while an outer tire rotates around the shaft. The shaft of the probe thus must be held and positioned such that the transducer always points at the surface, meaning that the wheel is not titled in its roll and pitch directions.

Thus, one of the challenges in using a DCP is that the probe needs to always be perpendicular (normal) to the surface being inspected and this can be a challenge while the inspection vehicle is mobile and navigating the surface. This is especially difficult since the inspection vehicle can drive circumferentially, longitudinally and helically on a pipe or tank surface which means that the DCP has to be realigned to ensure that the DCP is normal to the surface being inspected regardless of the location of the inspection vehicle.

The present invention provides a solution for providing vehicular movement in non-gravity-dependent operations, where the impact of gravity on vehicle movement can be minimized while still enabling versatile control. As well, the present invention is capable of effectively navigating a variety of curved surfaces such as pipes and vessels, as this is one possible use of the invention. The present invention is also directed to a mechanism (device/apparatus) that both normalizes the sensor (e.g., DCP) relative to the surface being inspected when inspection is being performed and while the inspection vehicle is being steered and/or moved in a variety of different tracks along the surface despite a varying range of degrees of curvature of the surface.

It is with respect to these and other considerations that the disclosure made herein is presented.

SUMMARY OF THE INVENTION

According to an aspect of the present invention, a robotic vehicle chassis is provided. The vehicle chassis includes a first chassis section. The first chassis section including a drive wheel mounted to the first chassis section and configured to drive along the surface and a front support point mounted to a bottom side of the first chassis section near a front end thereof. The vehicle also includes a second chassis section and a follower wheel assembly mounted to the second chassis section. In particular, the follower wheel assembly includes a follower wheel configured to passively roll generally in a direction of travel of the vehicle along the surface.

The vehicle also includes a hinge joint connecting the first and second chassis sections such that the second chassis section is capable of rotation with respect to the first chassis section along a first path in at least a first direction. The hinge joint is passive in nature and rotates in response to a curvature of the surface upon contact between at least a portion of the trailing wheel assembly. The vehicle also includes a four-bar linkage connecting the first and second chassis sections. The four-bar linkage is configured to move the second chassis section with respect to the first chassis section along a second path in at least a second direction. In addition, the four-bar linkage is passive in nature and automatically moves the second chassis section along the second path. Moreover, the combination of movement in the first direction and the second direction cause the trailing wheel to remain in contact with the surface.

According to a further aspect, the vehicle further comprises a roll joint connecting the second chassis section to the trailing wheel assembly. In particular, the trailing wheel assembly is capable of rotation with respect to the second chassis section about the roll joint. In addition, the roll joint is passive in nature and is configured to automatically at least substantially normalize the trailing wheel in a roll direction relative to the surface as the trailing wheel assembly makes contact with the surface.

These and other aspects, features, and advantages can be appreciated from the accompanying description of certain embodiments of the invention and the accompanying drawing figures and claims.

BRIEF DESCRIPTION OF THE DRAWING FIGURES

FIG. 7A is a perspective-view diagram of an exemplary follower wheel assembly in accordance with one or more disclosed embodiments;

FIG. 7B is a perspective-view diagram illustrating additional features of the follower wheel assembly of FIG. 7A in accordance with one or more disclosed embodiments;

FIG. 7C is a rear perspective-view diagram illustrating additional features of the vehicle of FIG. 1 and follower wheel assembly of FIG. 7A in accordance with one or more disclosed embodiments;

FIG. 8A is a rear perspective-view diagram illustrating additional features of the vehicle of FIG. 1 and follower wheel assembly of FIG. 7A in accordance with one or more disclosed embodiments.

DETAILED DESCRIPTION OF CERTAIN EMBODIMENTS OF THE INVENTION

Figure 1:
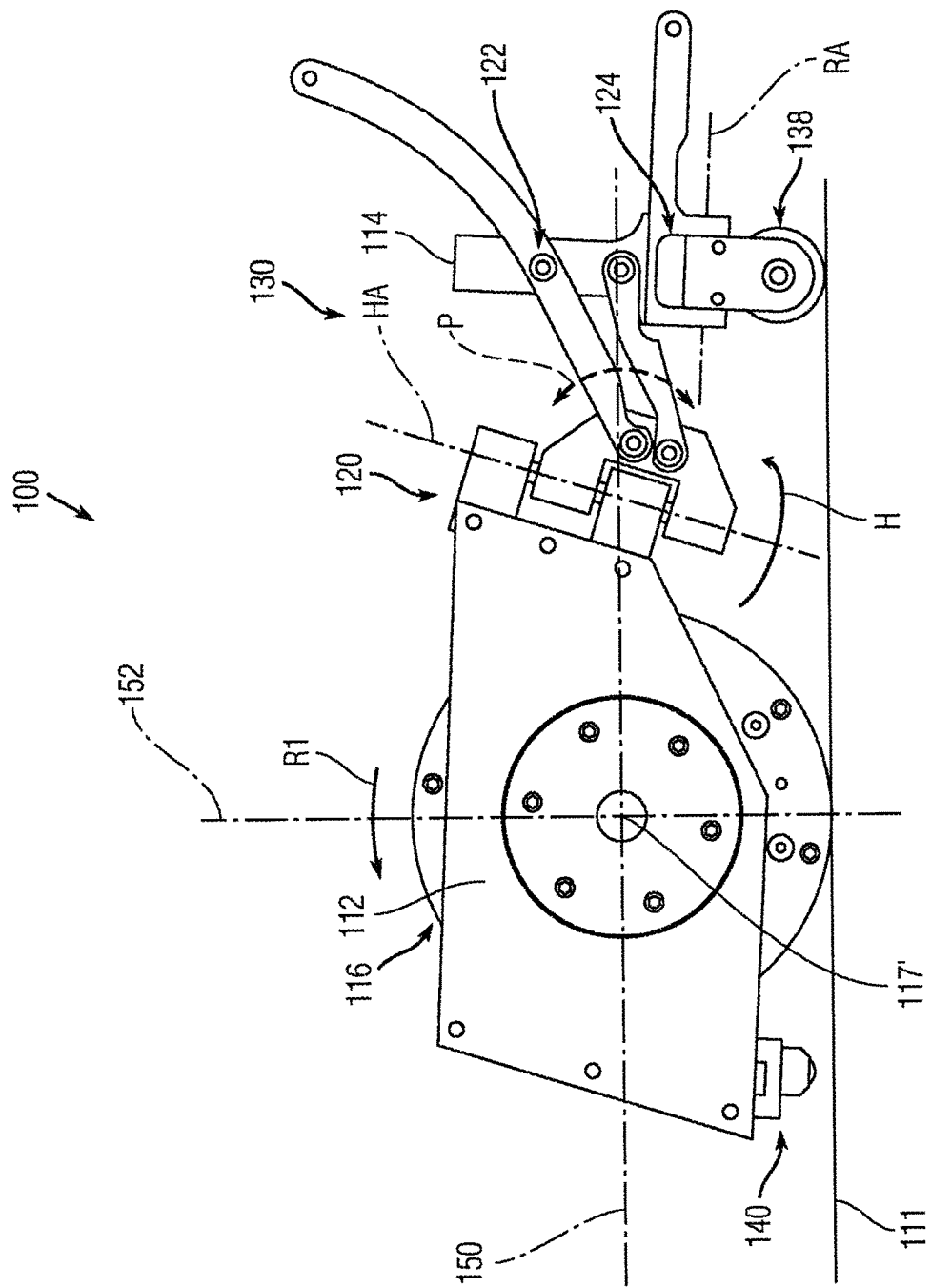
FIG. 1 is a side-view diagram of a vehicle having a passive rear-facing apparatus in accordance with one or more disclosed embodiments.

By way of overview and introduction, a compact robotic crawler vehicle is disclosed. The vehicle is configured to be capable of traversing surfaces of almost any curvature with high dexterity and maneuverability regardless of surface geometry and orientation.

According to an aspect of the invention, the vehicle is comprised of a front chassis section including a magnetic drive wheel configured to drive the vehicle along a surface and steer the vehicle. The front end chassis also includes a front-end support point, preferably, configured to maintain contact with the surface and provide stability to the front chassis and the vehicle more generally. The vehicle also includes a passive rear-facing, or "trailing," apparatus that supports a follower wheel. The rear-facing apparatus is specifically designed to maintain a follower wheel in contact with and oriented normal to the surface and, more generally, to maintain the vehicle upright relative to the surface.

The exemplary vehicles disclosed herein have a generally in-line wheel configuration, meaning that the main drive wheel that is supported by the front chassis and the trailing wheel that is supported by the rear chassis are configured to be generally in-line along the vehicle's longitudinal axis, which runs lengthwise through the vehicle, such that the drive wheel and the trailing wheel rotate in the same general direction. However, as further described herein, the follower wheel has the freedom to move out of alignment with the front drive wheel as the vehicle is traversing the surface as a result of the surface curvature and steering of the first chassis section. It is also worth noting that the front support point, the drive wheel and the follower wheel are the three main components that are in contact with the surface. Preferably, the supporting chassis sections and connecting structures do not contact the surface during operation. It should be further noted that each of the aforementioned components can provide one or more points of contact with the surface, respectively. For instance, as further described herein, the drive wheel can be a magnetic wheel including two spaced apart yokes that each provide a point of contact with the surface. By way of further example, the follower wheel assembly can be comprised of two spaced apart passively rolling wheels that provide a respective point of contact with the surface.

According to a salient aspect, the rear-facing assembly comprises a number of joints that join the front chassis to the rear chassis including, without limitation, a four-bar linkage and a swivel joint that provide respective degrees of freedom of movement. The swivel joint, for example, allows the rear chassis to fold to the side of the front chassis to maintain uprightness and stability of the vehicle while it driven and steered using the drive wheel. The four-bar linkage, for example, is configured to allow the rear chassis and thus the follower wheel to move up and down relative to the front chassis. In addition, preferably, the four-bar linkage is configured to stabilize the vehicle during operation by constantly pressing the follower wheel against the traversed surface and, thus, forcing the front chassis of the vehicle to pitch forward such that the front support point maintains contacts the traversed surface.

Optionally, the follower wheel can be joined to the rear-chassis by a roll joint that allows the follower wheel to pivot, or "roll," about the roll joint axis, which extends perpendicular to the axis of rotation of the follower wheel in the general direction of travel of the follower wheel. Consequently, the characteristics of the swivel motion, the four-bar linkage motion and, optionally, the "roll" motion of the follower wheel allow the follower wheel to remain generally perpendicular to the traversed surface (i.e., "normalized" or in a "normal orientation" in one or more directions relative to the surface) during operation. Although the exemplary embodiments discussed below describe implementations in which a hinge joint is connected to the front-chassis section and the four-bar linkage extends rearward from the swivel joint. Alternatively, the front chassis section can be attached to the four-bar linkage and the swivel joint can join the opposing end of the four bar linkage to the rear-chassis section that supports the follower wheel without departing from the scope of the disclosed embodiments.

Referring to FIG. 1, an exemplary robotic vehicle 100 in accordance with an embodiment of the invention is shown. As shown, the vehicle can be in the form of a magnetic crawler inspection vehicle (such as a robot as shown herein) that can be controllably driven across the surface 111, for example, for inspection of one or more regions of the surface 111 using one or more on-board sensor probes (not shown).

For example, the vehicle 100 can be a robotic device that can be controlled by a user who can transmit control commands to the vehicle to control the operation of the vehicle. In this manner, the user can effectively drive the vehicle across the surface and can stop and steer the vehicle as well.

The robotic vehicle 100 includes a first chassis section 112 and a second chassis section 114. A drive wheel 116 is connected to the first chassis section 112 and a follower-wheel 138 is connected to the second chassis section 114. Thus, the first chassis section 112 provides the means for moving the vehicle 100 across the surface 111, while the follower wheel passively trails the first chassis section. In some exemplary configurations, one or more of the wheels can be formed of a magnetic material to allow the robotic inspection vehicle 100 to magnetically attach to a metal surface 111, such as a metal pipe or metal storage tank and be movable thereacross. It should be appreciated that, as further described herein, the follower wheel 138 can comprise a follower wheel assembly including a plurality of wheels, for instance, magnetic wheels and sensor probe wheels.

In the robotic vehicle's preferred direction of travel, which is indicated by arrow "D," the drive wheel 116 of the robotic vehicle rotates about its axis 117 in a direction indicated by arrow "R1" in response to one or more motors that propel the vehicle forward. The axis of rotation of the drive wheel extends along the lateral axis 154 (not shown), which runs widthwise through the first chassis section. Perpendicular to the lateral axis and extending lengthwise through the first chassis section (e.g., parallel to the flat surface 111) is the longitudinal axis 150. Also shown in FIG. 1 is the perpendicular axis 152, which extends perpendicularly to both the longitudinal axis and the lateral axis and is normal to the surface 111 (i.e., extends between the contact point of the drive wheel and the drive wheel's axis of rotation 117).

It can also be appreciated that the drive wheel can also be configured to propel the vehicle in the opposite direction as well as steer the vehicle, as further described herein. It can be further appreciated that the drive wheel provides stability to the vehicle 100. In particular, the drive wheel can include a strong magnet which creates a pull force between the wheel and a ferromagnetic surface on which the vehicle can be moved, and this structural arrangement assists in resisting tipping of the vehicle. In addition, the drive wheel can have a relatively wide stance, which further provides stability to the vehicle.

Although not shown, the first chassis section can include a control module. The control module can include a motor, a drive assembly for transferring mechanical power from the motor to the drive wheel 116, a power source (e.g., battery), and a controller that, using a processor, can control the operation of the vehicle by processing sensed data, processing stored instructions, and/or processing control instruction/signals received from a remote computer/operator (not shown). The first chassis section 112 can also further include other operating parts including a steering mechanism.

Drive Wheel

Figure 3A:
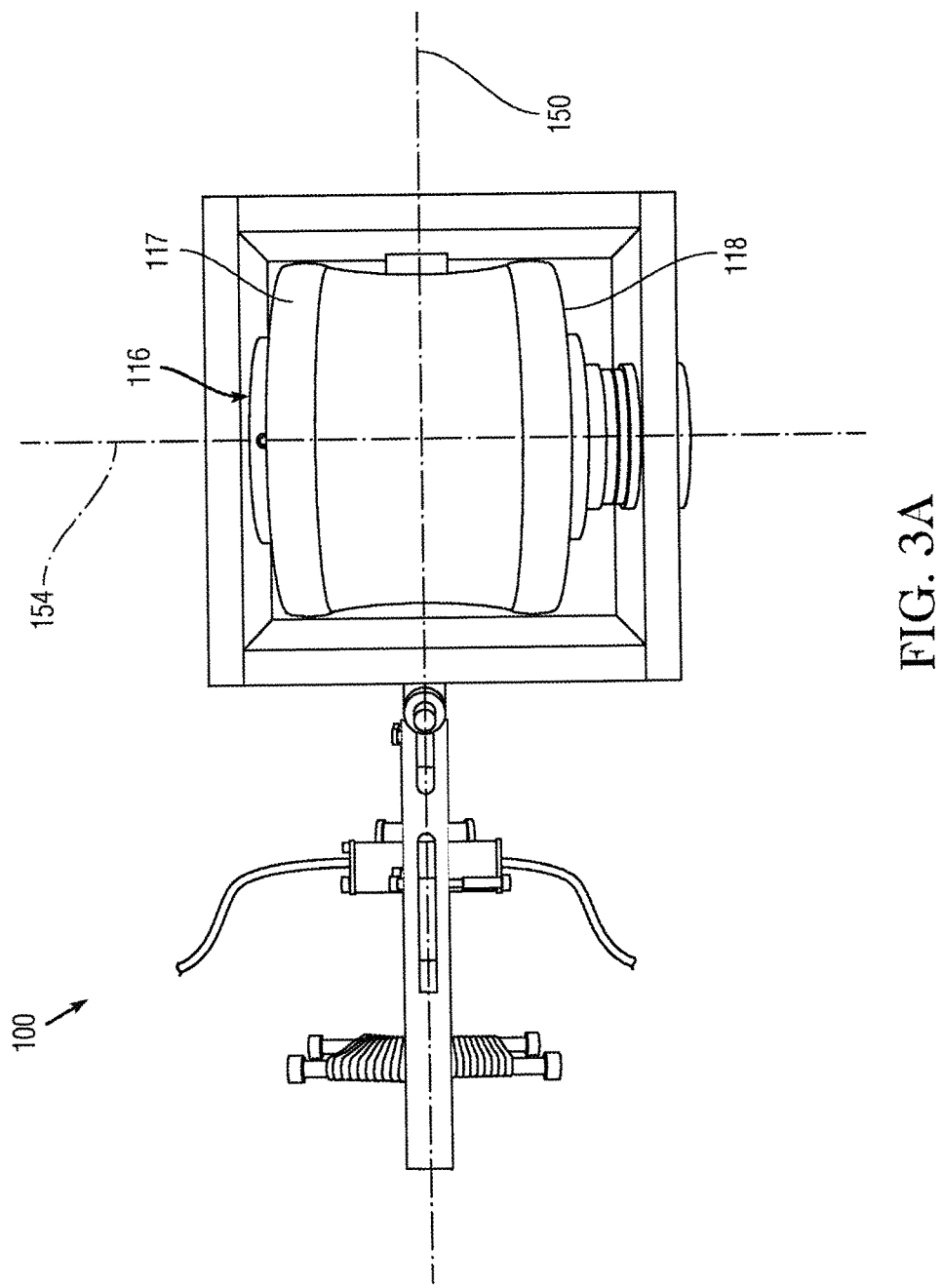
FIG. 3A is a top-view diagram illustrating additional features of the vehicle of FIG. 1 in accordance with one or more disclosed embodiments.

With respect to the drive wheel that propels and can steer the vehicle 100, in some implementations, the drive wheel 116 can comprise a magnetic wheel including spaced apart yokes or hubs. More specifically, as shown in FIG. 3A, which is a top view of the vehicle 100, the magnetic drive wheel 116 can be comprised of an axially magnetized cylindrical magnet (not shown) sitting between two separated steel yokes 117 and 118 which can act as magnetic flux concentrators. Additionally, although not always required, the yokes are preferably configured to be independently driven so as to be able to rotate the two yokes differentially and thus achieve full maneuverability of the vehicle 100. For instance, in some implementations, an angular contact bearing (not shown) sitting between the magnet and at least one of the yokes is one exemplary way of achieving independent rotation. Other possible configurations are envisioned, such as combining needle thrust bearings with regular ball bearings (also not shown). Preferably, the bearing seat should be configured to produce the smallest possible airgap between the steel yoke and the magnet's side face and also to maximize the overlap between the magnets side face and the portion of the steel yoke sitting across the air gap from it, this is in order to maximize the resulting pull force of the magnetic wheel.

A configuration that allows one of the drive yokes of the driving wheel to rotate freely is useful when pivoting in place. Such an arrangement allows rotation about truly a single point (e.g., a point of contact of one of the yokes and the surface) rather than the center of the driving wheel (i.e., the intersection of axis 150 and 154). This arrangement can also prevent the driving wheel from damaging the surface as it slides through the rotation. The driving wheel can also have curved (and/or textured or coated) points of contact (i.e., the rim of each yoke) such that each side of the driving wheel contacts the surface at just one point regardless of the curvature. As one example, the rim can be knurled to provide texture. As another example, the rim can be coated with rubber or polyurethane. Such an arrangement can improve the consistency of pull force and friction and can also improve the performance of the drive mechanism and reduce the power consumption of the drive wheel when pivoting.

Accordingly, the drive wheel 116, and thus the robotic vehicle 100, can be controllably steered in any number of directions along the surface 111 including, for example and without limitation, circumferentially, longitudinally, in a helical path and the like.

Front Support Point

Also shown in FIG. 1 is a front support 140 provided near the front end of the first chassis section 112. In some implementations, the front support is centered, e.g., in line with the longitudinal axis 150 that extends through the middle of the front chassis section. The front support can be configured to limit the amount that the first chassis section can pitch forward about the axis 117 of the drive wheel 116, thereby preventing the front end of the first chassis section from dragging along the surface 111. In some implementations, the front support 140 can comprise a passively rolling ball-caster, however, alternative front support configurations can be implemented. For instance, the front support can comprise a piece of rigid smooth plastic configured to slide along the surface. In such a case, preferably, a material having a low coefficient of friction can be used to facilitate the sliding of the front support and help prevent scratches on the surface. In some implementations, magnets can also be embedded at or near the front support, for instance, behind or around the front-facing support so as to assist in maintaining the front support in contact with the surface and, thus, reducing the amount of work performed by the rear facing-mechanism in order to maintain the front support in contact with the surface, as further described herein.

Hinge Joint

According to a salient aspect, the first chassis section 112 and second chassis section 114 are connected together via a plurality of connection elements or joints that each provide movement in one or more degrees of freedom between the two chassis sections. In particular, as shown in FIG. 1, a first connection element can include a hinge 120 or "swivel joint." The hinge 120 can be of several different types, including a knuckle/pin hinge or ball and detent hinge, for example. The hinge 120 provides a first degree of freedom of movement (DoF) between the first and second chassis sections, namely, side-to-side movement. In particular, chassis sections 112 and 114 are rotatable through a range of degrees with respect to each other about the axis HA of hinge 120, as indicated by arrow H. Accordingly, the hinge allows the trailing portion of the second chassis section to fold to the side of the first chassis section, for instance, for steering purposes and maintaining stability of the vehicle 100 while steering. As discussed herein, this degree of freedom can be passive.

Figure 2A:
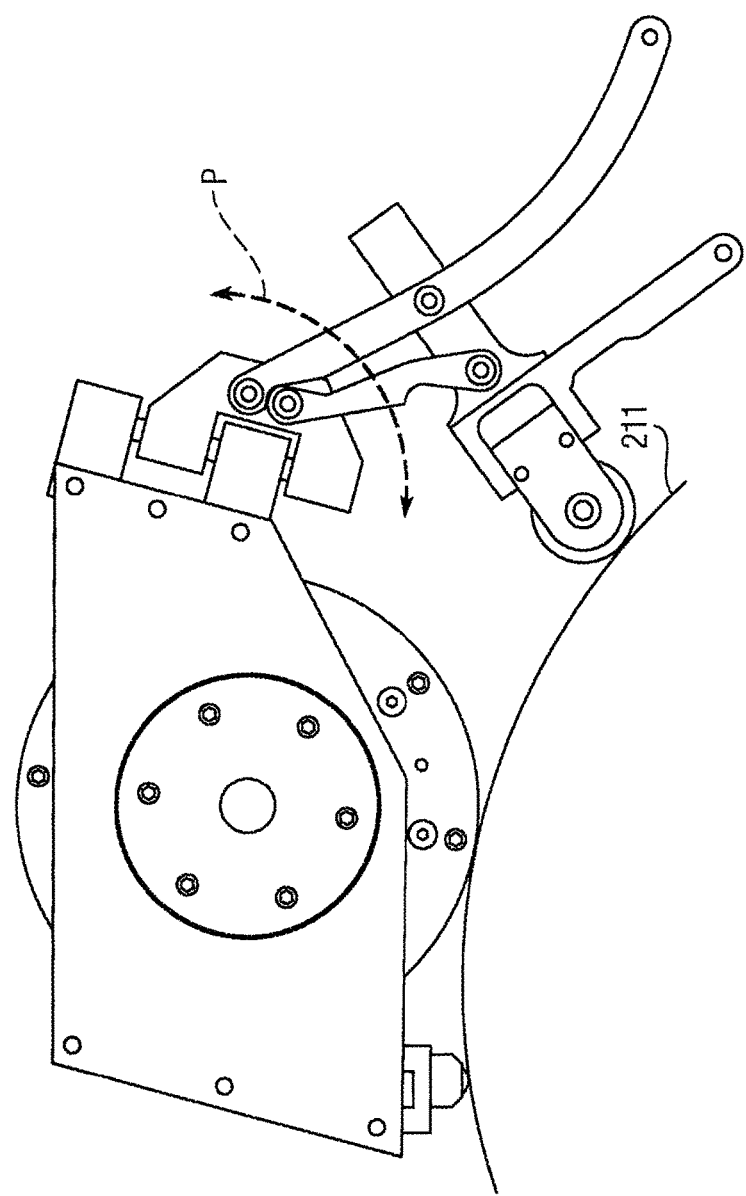
FIG. 2A is a side-view diagram illustrating additional features of the vehicle of FIG. 1 in accordance with one or more disclosed embodiments.
Figure 2B:
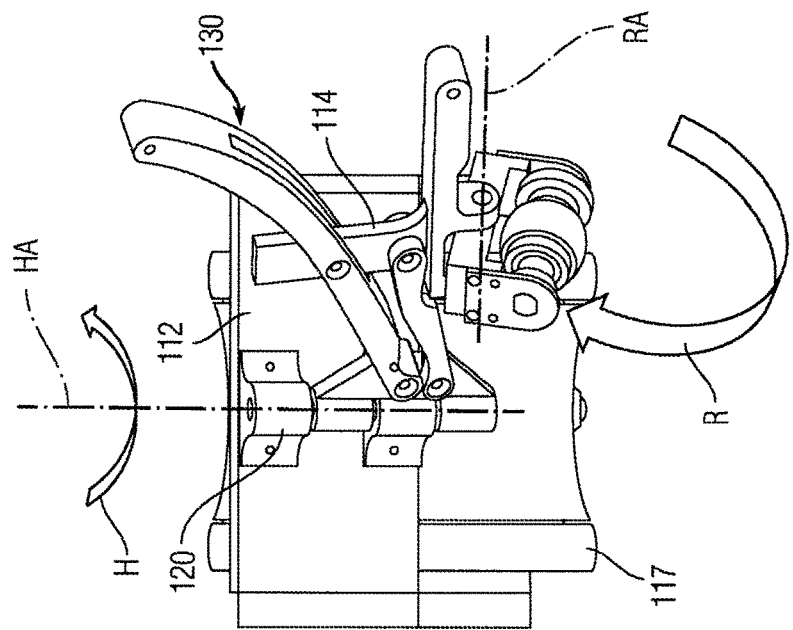
FIG. 2B is a rear-view diagram illustrating additional features of the vehicle of FIG. 1 in accordance with one or more disclosed embodiments.

Turning briefly to FIG. 2B, the axis HA of hinge 120 is preferably oriented in a plane (not shown) that extends along the longitudinal axis 150 (not shown) and perpendicular axis 152 (not shown), in other words, a plane that bisects the first chassis section 112 into left and right halves (referred to as the "longitudinal plane"). In addition, as shown in FIG. 1, the hinge 120 can be oriented such that axis HA forms an angle $\alpha$ relative to the longitudinal axis 150. Accordingly, in implementations where a is not 90 degrees, movement of the second chassis section 114 about the axis HA can result in raising or lowering of the second chassis section relative to the first chassis section (e.g., the follower wheel 138 can move in an up and down direction but along an arcuate path while pivoting about axis HA). It can thus be appreciated that the first degree of freedom, as well as other degrees of freedom described herein, are not necessarily limited to motion in a single plane. As further described herein, the angle of the hinge $\alpha$ can also be defined to obtain specific side-to-side and up-down movement characteristics that achieve beneficial stabilizing and normalizing effects of the rear-facing assembly.

Figure 3B:
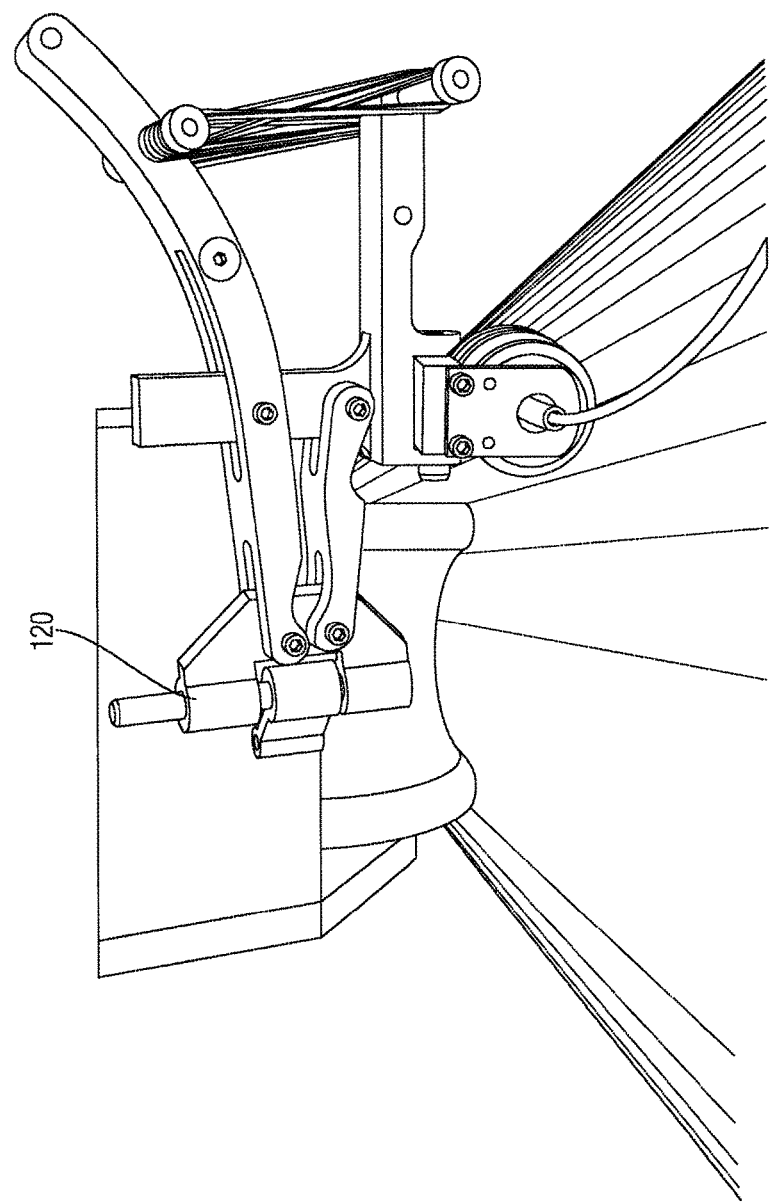
FIG. 3B is a rear-view diagram illustrating additional features of the vehicle of FIG. 1 in accordance with one or more disclosed embodiments.

As noted, the hinge joint 120 allows the rear mechanism to fold to one side of the vehicle 100 when it steers. This will allow the vehicle to achieve a high level of maneuverability and minimize any scratches or markings that could potentially be left by the crawler on the target surface. For instance, FIG. 3B, which is a rear-view of the vehicle 100 traversing a pipe, shows the trailing assembly pivoted about hinge 120 such that it extends almost perpendicular to the longitudinal axis of the first chassis section 112, say, as if the vehicle was previously traversing circumferentially about the pipe and then the first chassis section 112 was steered 90 degrees so as to continue traversing longitudinally along the length of the pipe. Also, it should be noted that the same pivoting function of the follower wheel can be achieved regardless of the order in which the swivel joint and four-bar linkage are connected to the chassis (i.e., in an alternative configuration in which the four-bar linkage is joined to the first chassis section 112 and the pivot is connected to the opposite end of the four-bar linkage).

Four-Bar Linkage

The vehicle 100 preferably includes additional joints that provide further degrees of freedom between the first and second chassis sections 112 and 114 of vehicle 100. For instance, as shown in FIG. 1, vehicle 100 can include a four-bar linkage 122 that, at least indirectly, connects the first and second chassis sections 112 and 114 together and provides a second degree of freedom of movement between the two chassis sections. The second degree of freedom can be an up and down movement (e.g., the follower wheel 138 and, more generally, the second chassis section can move in an up and down direction relative to the first chassis section but along a slightly curved path as indicated by arrow "P") (which can be generally thought of as a pitch direction) and facilitates lowering and raising of the follower wheel 138. Thus, the second degree of freedom is not limited to movement in only a linear direction but can include a curved path.

More specifically, as a result of the particular geometry of the four links and pivot points defining the four-bar linkage, second chassis sections 114 are moveable relative to first chassis section 112 along arc P in order to maintain the follower wheel 138 in contact with the surface 111, even as the curvature of the traversed surface changes. For instance, FIG. 1 illustrates the trailing wheel 138 in contact with the surface 111, which is generally flat as if the vehicle 100 is traversing longitudinally along a length of pipe. FIG. 2A, also depicts the trailing wheel 138 in contact with a surface 211, which is curved as if the vehicle 100 is traversing circumferentially about a pipe. FIG. 2A further illustrates the articulation of the four bar linkage along the arc P so as to maintain the follower wheel 138 in contact with the surface 211. Although the up and down movement of the four-bar linkage is generally passive, as further described herein, the movement can be biased or assisted using tensioning springs and the like so as to maintain the trailing wheel in contact with the traversed surface during operation.

Roll-Joint

According to a further aspect of the invention, optionally, the assembly supporting the follower wheel 138 can be joined to the second chassis section 114 by a "roll joint" 124, which provides a third degree of freedom, namely, motion of the follower wheel in a roll direction. In particular, the follower wheel assembly can be configured to roll or pivot through a range of degrees relative to the second chassis section 114 about the roll axis "RA" that extends through the pivot point of the roll joint, as indicated by arrow "R." Thus, the roll joint 124 provides another degree of freedom of movement for the follower wheel relative to the first and second chassis sections.

Figure 2C:
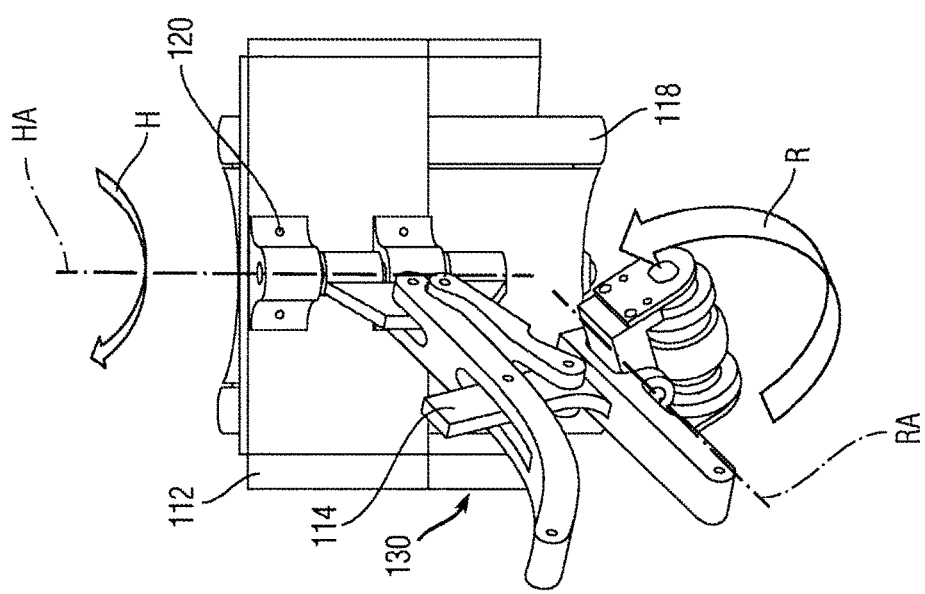
FIG. 2C is a rear-view diagram illustrating additional features of the vehicle of FIG. 1 in accordance with one or more disclosed embodiments.

FIGS. 2B and 2C are rear views of the vehicle 100 and further illustrate the third DoF provided by the optional roll joint 124, namely, roll motion about axis RA as indicated by arrow R. Also shown is the first DoF (i.e., pivoting movement) of the second chassis section 114 about the axis HA of the hinge 120, as indicated by arrow H. FIGS. 2B and 2C further illustrate the articulation of the four-bar linkage 120 that facilitate up and down movement of the second chassis section 114 relative to the first chassis section 112. Also shown in FIGS. 2B and 2C is an exemplary configuration of the drive wheel 116, which comprises two independently drivable yokes namely, a left yoke 117 and a right yoke 118.

The second chassis section 114, which supports the follower wheel 138, the links connecting the second chassis section to the first chassis section 112 (i.e., the hinge 120 and the four-bar linkage 122), and the optional roll joint 124 are collectively referred to as the rear-facing apparatus 130. Thus, it can be appreciated that the rear-facing assembly 130 includes a number of components that can be thought of as being different sub-assemblies that mate together to form the rear-facing assembly.

As discussed in more detail below, the ranges of movement of one or more components of the rear-facing assembly 130 relative to the first chassis 112, namely, rotation about the hinge 120, pitching motion provided by the four-bar linkage 122 and, optionally, the roll motion provided by the roll joint 124, enable the follower wheel 138 to remain normalized while traversing structures having a wide range of surface curvatures/geometries and in various directions of travel. In addition, the range of degrees of motion between the first and second chassis sections 112 and 114 in the various degrees of freedom provides flexibility of movement for the vehicle 100 to traverse curved surfaces while the drive wheel 116 and follower wheel 138 remain in contact with and normal to the surface. In addition, as further described herein, the normalizing characteristics of the rear facing apparatus can be optimized for particular curved surfaces by defining the particular geometry of the rear facing mechanism.

The details of the exemplary vehicle 100, and more specifically the particular configuration of the components that define the rear-facing apparatus 130 can be further appreciated in view FIGS. 3A-7, which are further discussed below with continued reference to FIGS. 1-2C.

Figure 5A:
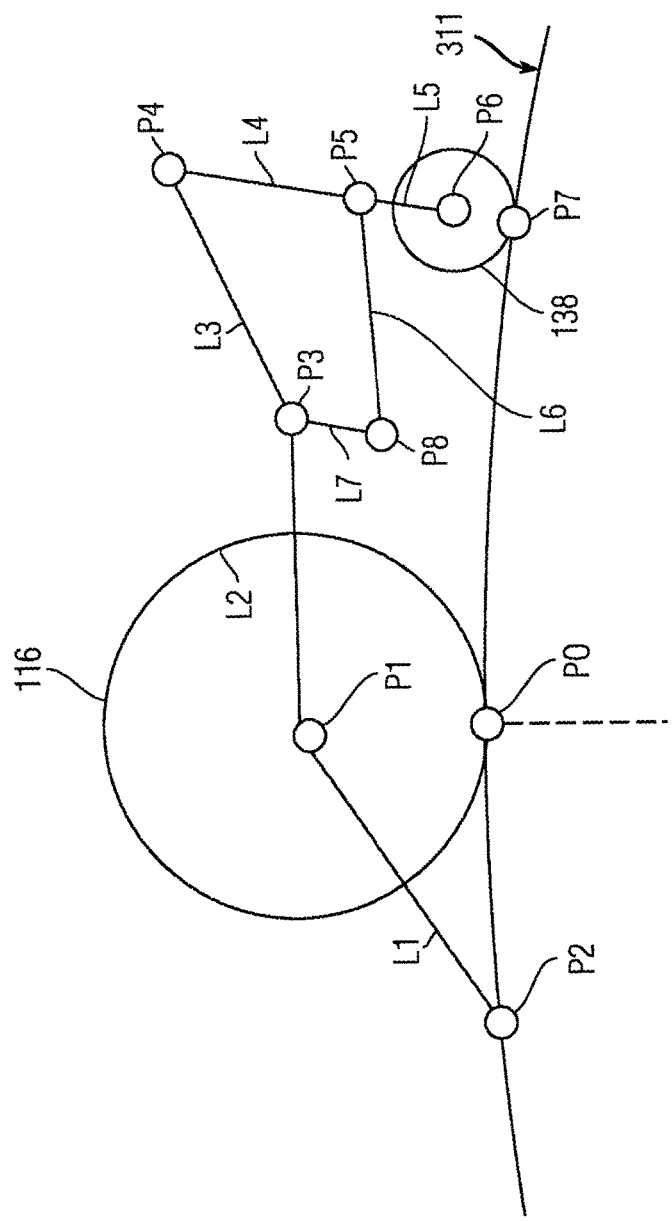
FIG. 5A is a simplified side-view conceptual schematic illustrating additional features of the vehicle of FIG. 1 in accordance with one or more disclosed embodiments.
Figure 5B:
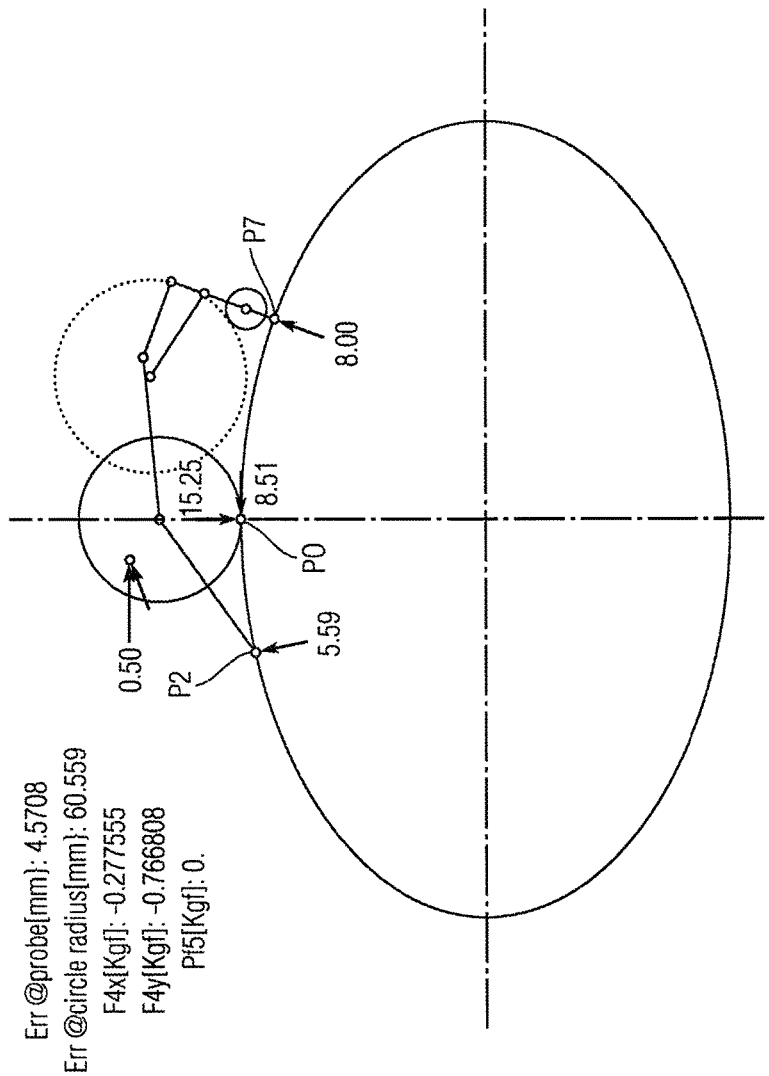
FIG. 5B is a simplified side-view conceptual schematic illustrating additional features of the vehicle of FIG. 1 in accordance with one or more disclosed embodiments.

FIG. 5A is a simplified schematic model of the exemplary robotic vehicle 100 and illustrates an exemplary geometric configuration of the four-bar linkage 122 as it operates helically on a cylindrical surface 311. Accordingly, for simplicity, the schematic diagram does not illustrate a hinge joint which, in some implementations, can join the first chassis section (not shown) with points P3 and P8 of the four-bar linkage and further does not illustrate the optional "roll" joint which can be provided between points P5 and P6.

As shown in FIG. 5A:
- P0 represents the contact point between the magnetic drive wheel 116 (only the circumference of the drive wheel is shown) and the traversed surface 311.
- P1 represents the rotational axis of the magnetic drive wheel 116.
- P2 represents the contact point between the front-facing support (not shown) and the surface 311.
- L1 represents the distance between P1 and P2 and L2 represents the distance between P1 and P3. As shown, L1 and L2 are maintained at a fixed angle relative to P2.
- P3, P4, P5 and P8 represent the four joints/pivot-points of the four-bar linkage.
- L3, L4, L6 and L7 represent the lengths of the links defining the four-bar linkage.
- P6 and P7 represent, respectively, the center axis of the rear follower wheel 138 (only the circumference of the rear follower wheel is shown) and its contact point with the surface 311.
- L5 represents the length of the second chassis section between P5 and P6.

Figure 4A:
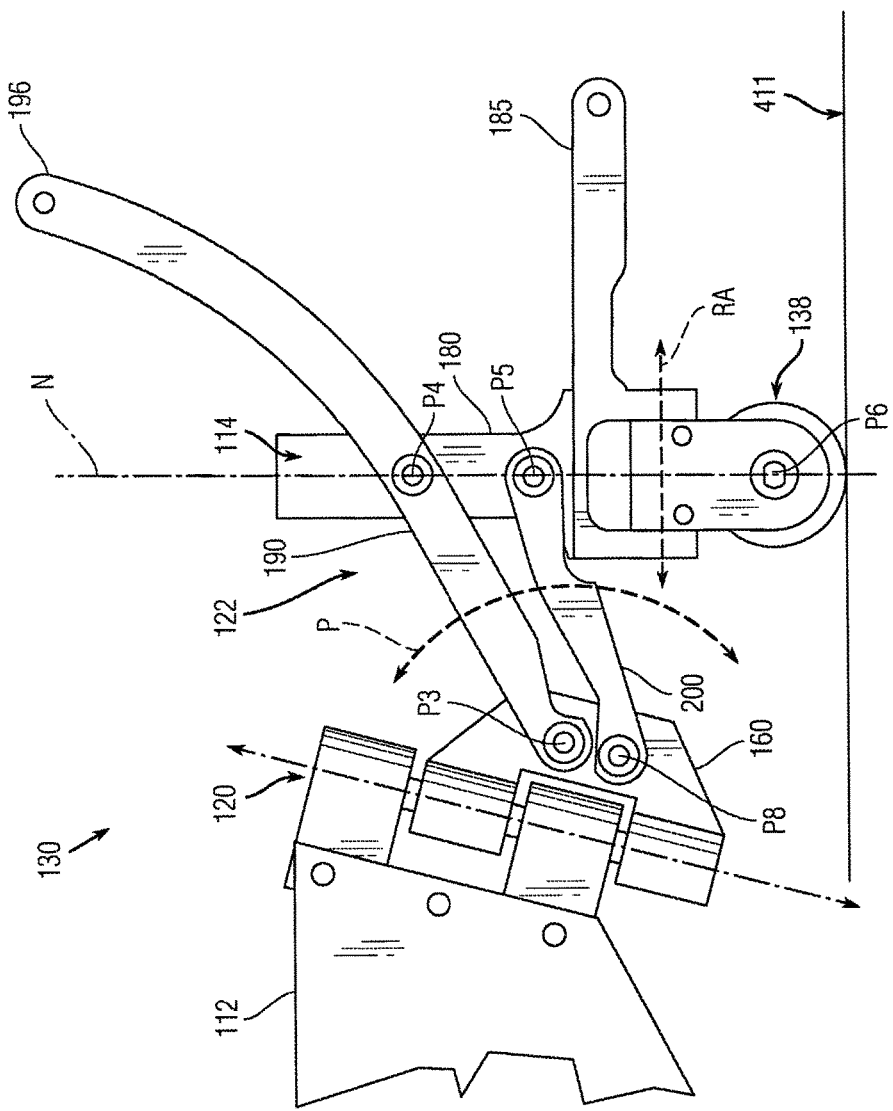
FIG. 4A is a side-view diagram illustrating additional features of the vehicle of FIG. 1 in accordance with one or more disclosed embodiments.
Figure 4B:
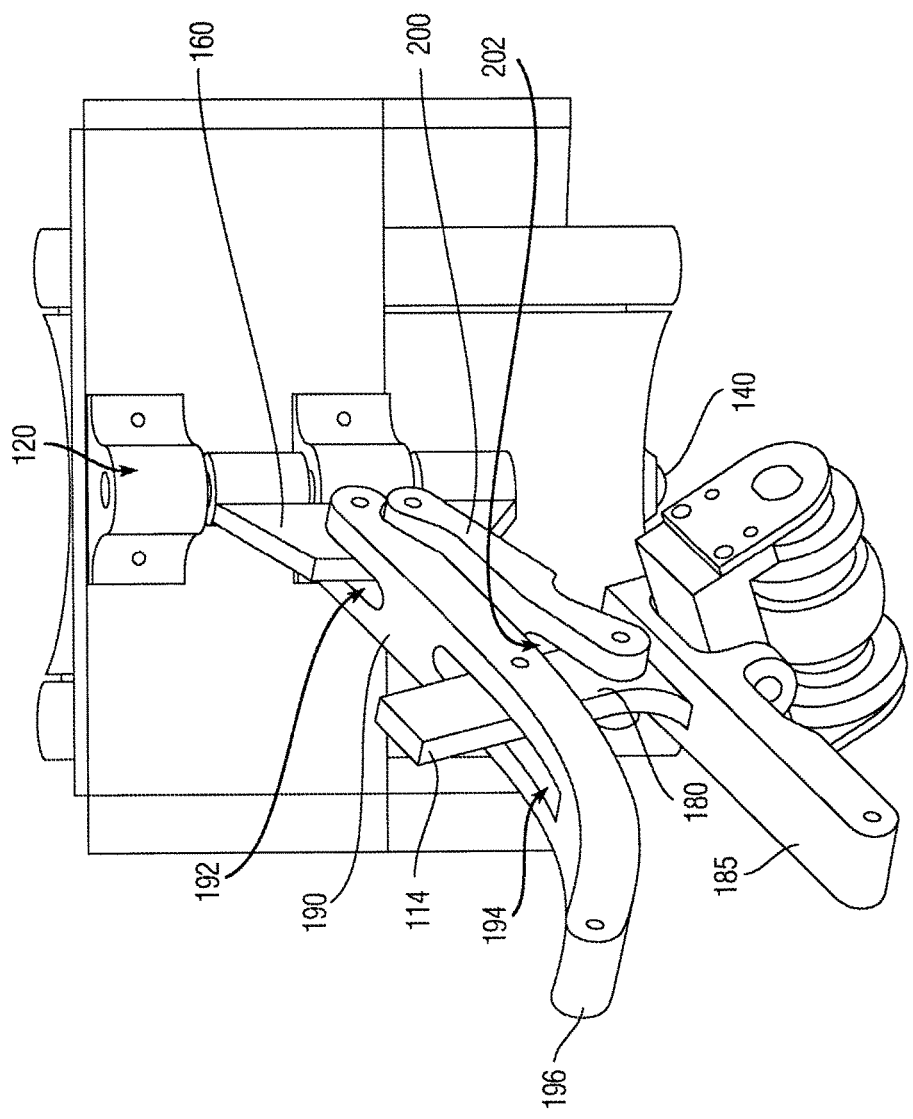
FIG. 4B is a rear-view diagram illustrating additional features of the vehicle of FIG. 1 in accordance with one or more disclosed embodiments.

FIGS. 4A-4B, which are a close-up side view and rear-perspective view of the exemplary rear-facing assembly 130 of vehicle 100, further illustrate an exemplary configuration of the four-bar linkage 122. The four-bar linkage includes two links that are oriented generally in a vertical direction (relative to a flat surface 411), namely, first linkage plate 160 and a second linkage plate 180, which is spaced apart from the first linkage plate. As shown, in some implementations, the second linkage plate 180 can be a portion of the second chassis section 114. Moreover, in some implementations, the first linkage plate 160 can be coupled to or otherwise define a portion of the hinge 120 linking the four-bar linkage 122 to the first chassis section 112. In other implementations, the first linkage plate can be directly coupled to the chassis 112.

The four-bar linkage also includes two links that extend between the first and second linkage plates generally in the direction of a first connector arm 190 and a second connector arm 200 that are spaced apart in the vertical direction. In one embodiment, the first and second connector arms 190, 200 can have different lengths. More specifically, the first connector arm 190 and the second connector arm 200 are in the form of structures that are each pivotally connected to the first and second linkage plates 160, 180. As shown in the figures, the first connector arm 190 is located above the second connector arm 200. The first and second connector arms 190 and 200 are configured to be pivotally attached to the first linkage plate 160 at pivot-points P3 and P8, respectively.

More specifically, in some implementations, as shown in FIG. 4B, a proximal end of each connector arm 190 and 200 can be shaped to include two opposing flanges defining an open-ended slot therebetween (e.g., slot 192 of connector arm 190) for receiving a portion of the linkage plate 180 within the slot. Accordingly, the connector arms 190 and 200 can be pivotably attached to the linkage plate 180 at pivot-points P3 and P8, respectively. The attachment means can include a pin or other suitable fastener that allows for rotation of the connector arms about the respective pivot-points.

The first and second connector arms 180 and 200 can be similarly attached to the second linkage plate 180 at pivot-point locations P4 and P5, respectively. As shown in FIG. 4B, in some implementations, the distal end of the second connector arm 200 can include flanges defining an open ended slot 202 for receiving a portion of the second linkage plate 180 therebetween. In addition, the first connector arm 190 can include a vertical slot 194 that extends through the arm and has closed ends. In addition, as shown, first connector arm 190 can extend rearward away from the slot 194 toward a free end 196.

As shown in FIG. 5A, the portion of the first connector arm 190 that extends between pivot-points P3 and P4 can have the length L2; the portion of the second connector arm 200 that extends between pivot-points P8 and P5 can have the length L6; the portion of first linkage plate 160 that extends between pivot points P3 and P8 can have length L7; and the portion of second linkage plate 180 that extends between pivot-points P4 and P5 can have length L4.

In some implementations, the links defining the four-bar linkage (e.g., linkage plates 160 and 180 and connection arms 190 and 200) can be shaped so as to avoid interference therebetween as they move through their prescribed ranges of motion about pivot points P3, P4, P5, P8. For example, FIG. 4A shows the first connector arm 190 and second connector arm 200 including complementary cut-outs near pivot points P3 and P8, respectively, that are shaped to allow the arms to rotate a prescribed amount about the pivot points. By way of further example, the bottom side of connector arm 200 can include a similar cut out near the pivot point P5 so as to allow for a prescribed range of motion without interference with the second chassis section 114. By way of further example, as shown in FIG. 4B, the slot 194 can have a length that allows the second chassis section 114 to pivot and move within the slot relative to the arm 190 as the four bar-linkage articulates during operation.

As noted previously, preferably, the vehicle 100 is configured to press or force the follower wheel 138 against the traversed surface so as to maintain the follower wheel in contact with the surface. In some implementations, this can be achieved by applying tension between at least two links of the four four-bar linkage (e.g., between one of the first and second linkage plates 160 and 180 and one of the first and second connector arms 190 and 200).

Figure 4C:
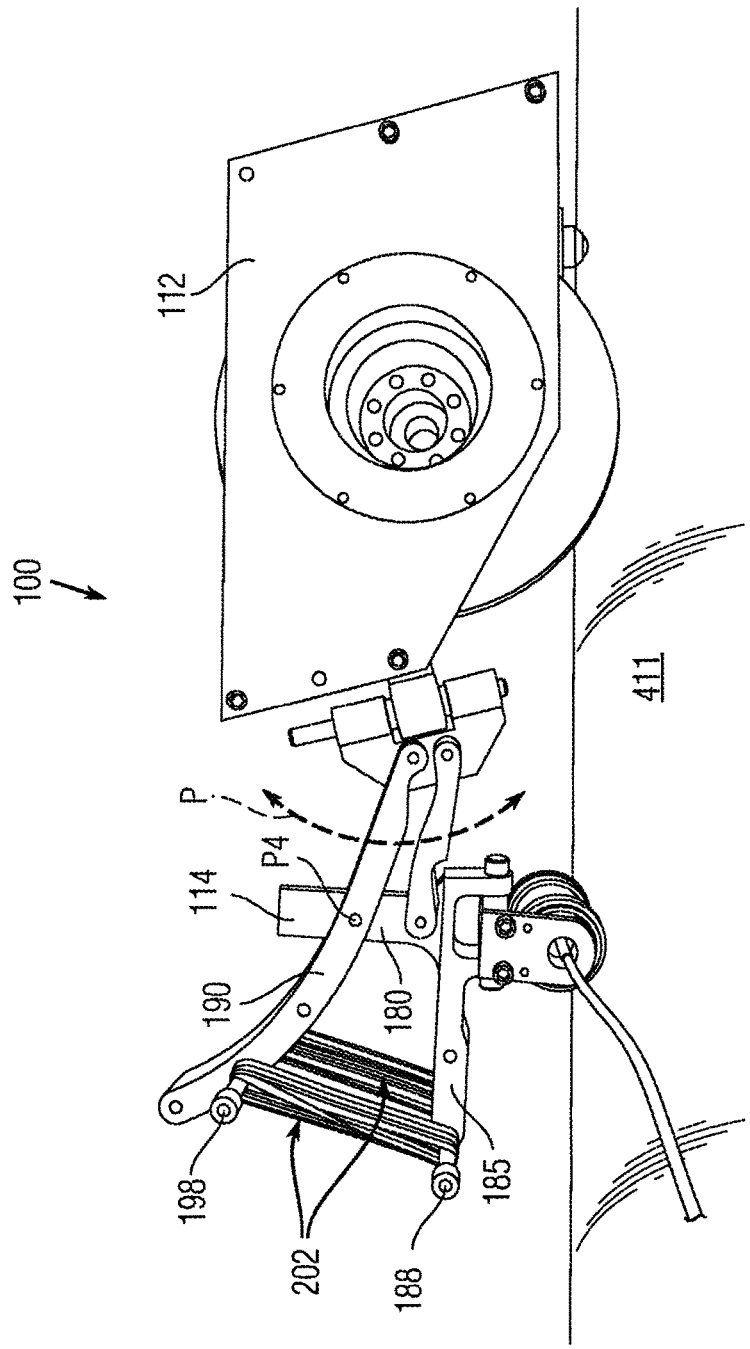
FIG. 4C is a side-view diagram illustrating additional features of the vehicle of FIG. 1 in accordance with one or more disclosed embodiments.

Applying tension between two of the four-bar linkage links can be achieved using springs, rubber bands or extending other such elastic items therebetween. In addition, in some implementations, the bands or springs can be attached to structural members or "extensions" that extend from one or more of the links such that, through increased leverage, the net force applied by the bands on various components the vehicle 100 is increased. For instance, as illustrated in FIGS. 4A-4C, second chassis portion 114 can include an extension member 185 that extends generally perpendicularly to the linkage plate 180 and rearward (i.e., away from the opposing front end of the vehicle). In addition, first connection arm 190 can include an extension section that extends rearward and upwards from pivot point P4 toward a free end 196. FIG. 4C is a side perspective view of the exemplary robot 100 and depicts horizontal pins 198 and 188 that, in some implementations, can extend from one or more sides of the first connector arm 190 and extension member 185, respectively. FIG. 4C also depicts tensioning rubber bands 202 disposed about horizontal pins that extend from both the left and right sides of the first connector arm 190 and the extension member 185 so as to apply tension therebetween.

The tension from the rubber bands 202 applied between pins 198 and 188 is translated via the links and pivot points defining the four-bar linkage 122 and results in a net force pushing the rear chassis section 114 and, thus, the trailing wheel 138 downward relative to the first chassis section 112 (i.e., toward the surface 411 along the arc P). As noted, forcing the trailing wheel against the traversed surface also serves to pitch the first chassis section 112 forward about the rotational axis of the drive wheel 116 and press the front support 140 against the surface. For instance, FIG. 5B, which depicts a computer-model of the static forces applied by a tensioned four-bar linkage on the simplified robotic vehicle of FIG. 5A traversing along a surface of a pipe, illustrates directional forces at P2 (the contact point between the front support point and the surface), at P0 (the contact point between the drive wheel and the surface) and at P7 (the contact point between the follower wheel and the surface). The directional arrows at P2 and P7 represent the reaction forces felt by the front support point and follower wheel, respectively. The directional arrow 505B on the side of the drive wheel represents the direction of gravity and the directional arrow 505A represents the force corresponding to the mass of the vehicle applied at its center of mass.

The forces applied by the tensioned four-bar linkage 122 can be adjusted by increasing or decreasing the number of tensioning elements, using tensioning elements that provide a prescribed tension force, as well as adjusting the locations on the rear-facing assembly 130 that tension is applied between (e.g., using longer extensions to increase leverage, changing the relative location of pins 188 and 198 on the extensions and otherwise adjusting the geometry of the four-bar linkage and/or extensions extending therefrom). For instance, in implementations further described herein, in which the follower wheel 138 is an assembly including a dry-coupled ultrasonic wheel probe disposed between two spaced apart magnetic wheels that all rotate about axis P6, the downward force on the follower wheel can be defined to compress the rubber wheel of the sensor probe a prescribed amount in order to obtain accurate sensor readings and ensure that one or more of the magnetic wheels, which can have a smaller diameter than the rubber probe wheel, contact the surface being traversed.

Although the exemplary implementation discussed previously can include rubber bands or springs extending between two links of the four-bar linkage, other methods for providing downward force can include, for example and without limitation: torsional springs acting between any two links of the four-bar linkage 122; tension springs from the bottom-end of the swivel joint 120 to the carrier of the follower wheel 138 (e.g., rear chassis section 114); compression springs between one or more links in the four-bar linkage and either the first chassis section 112 or the top end of the swivel joint 120; or a constant force spring (e.g., tape spring) acting between the four-bar linkage and the first chassis section 112 or swivel joint 120. In addition, actuators such as linear actuators and motors acting instead of or in addition to the spring-like elements mentioned above can be utilized to force the second chassis section 114 down against the surface being traversed.

It can be preferable to configure the tensioning assembly such that the force exerted on the second chassis section 114 does not overcome the traction provided by the follower wheel 138 so as to keep the follower wheel from slipping along the traversed surface. For instance, excessive tension force pushing the follower wheel against the surface, combined with the follower wheel resting on a curved surface, can lead to the rear-facing mechanism to swivel to one side of the first chassis section 112, thus, dragging the follower wheel sideways. In addition to defining the tension in view of the traction provided by the follower wheel on the particular curved surface, sideways slippage of the follower wheel can also be prevented by increasing the traction (i.e., coefficient of friction) of the follower wheel. For instance, a rim of one or more of the follower wheels can be knurled to provide texture. As another example, the rim can be coated with rubber or polyurethane.

Sideways slippage of the follower wheel can also be counteracted by incorporating one or more tension elements configured to exert a force that pulls the rear-facing mechanism 130 towards alignment with the centerline of the first chassis section 112 or, in other words, works to keep the hinge joint 120 centered. For instance, such a configuration can include a sheet of spring-steel configured to have a neutral position when the pivot is centered. In addition or alternatively, spring elements connecting parts of the rear-facing assembly 130 to both sides of the first chassis section can provide such a centering force while still allowing the rear-facing mechanism 130 to rotate about the hinge during operation.

In some implementations, it can also be preferable to utilize a drive wheel 116 having a suitably strong magnet such that the downward force exerted by the tensioning assembly on the second chassis section 114 does not overcome the magnetic force that maintains the drive wheel in contact with the traversed surface. Moreover, although the downforce applied by the tensioning assembly on the follower wheel 138 assists in maintaining the front support 140 against the surface so as to keep the vehicle 100 stable, it can be appreciated that in some instances this downward force can be overcome, thereby causing the front support point to break contact with the surface. For instance, in the case of traversing an obstacle on the surface, the front support point can contact the obstacle, which offers some initial resistance until the downward force of the rear mechanism is counteracted thereby causing the front support to temporarily detach from the surface and the first chassis section to rock back about the axis of the magnetic wheel and, thus, allowing the front support to overcome the obstacle.

Exemplary Method for Defining the Four-Bar Linkage Geometry

In accordance with one or more embodiments of the invention, the geometric configuration of the four-bar linkage 122 can be defined to optimize the normalization effect on the follower wheel 138 while traversing a pipe in a variety of possible directions and surface curvatures.

Figure 6A:
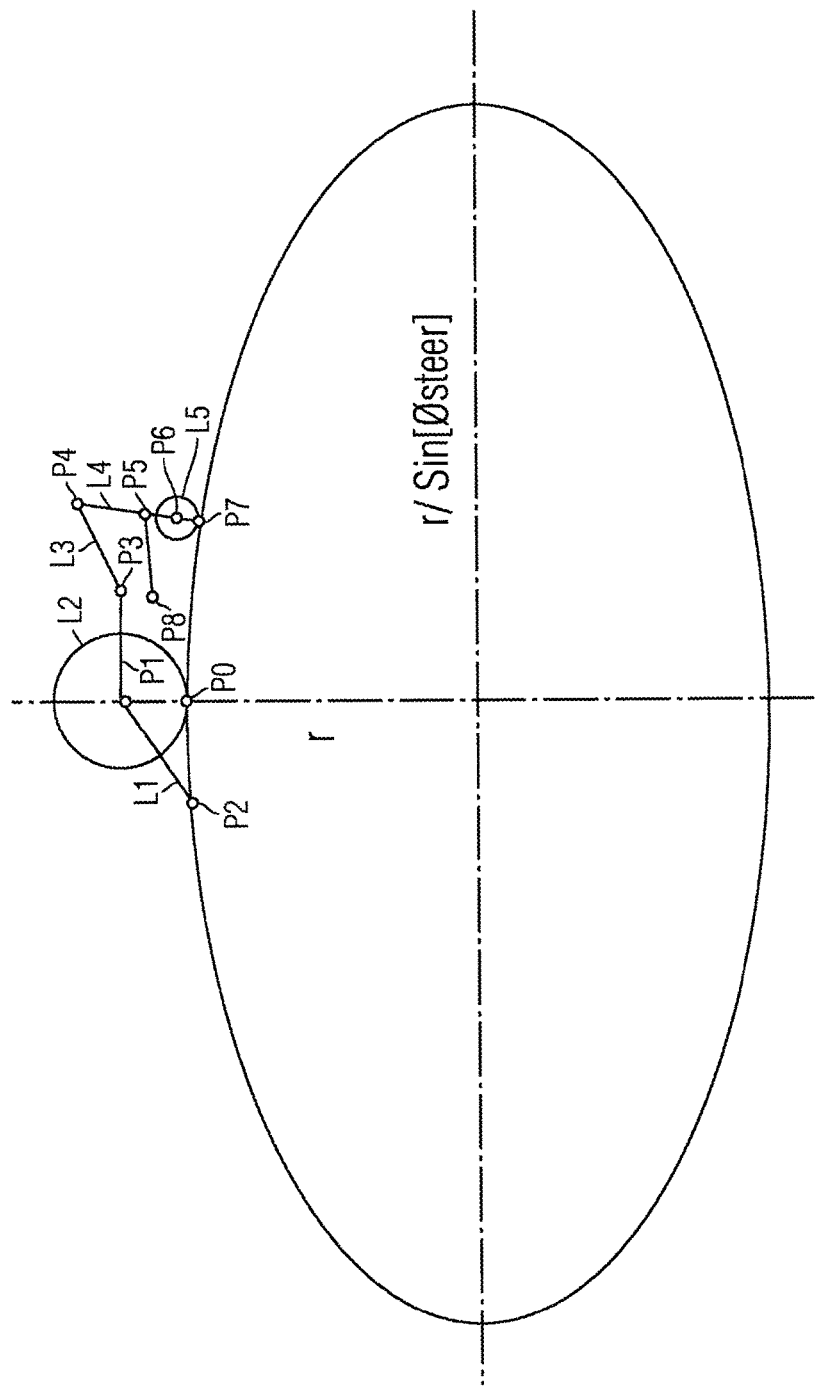
FIG. 6A is a simplified side-view conceptual schematic illustrating additional features of the vehicle of FIG. 1 in accordance with one or more disclosed embodiments.

FIG. 6A depicts the simplified schematic side-view of the robotic vehicle model shown in FIG. 5A, and further illustrates an approximation of the effective cross-section 600 of a pipe, the cross section being along the robot's middle plane as the robot traverses helically on the surface of the pipe. As shown in FIG. 6A, the effective cross section of the pipe corresponds to an ellipse. Furthermore, for a pipe of radius 'r', the aforementioned ellipse's minor will be equal to 'r' while its major will be equal to r/Sin(θsteer) where θsteer defines the angle between the cross section's plane and the pipe's centerline (or otherwise, the angle defining the pitch of the robot's helical path on the pipe). When θsteer=0, this represents the robot configured for a circumferential trajectory around the pipe (in other words, the ellipse turns into a circle of radius r). Similarly θsteer=90 degrees will yield an infinitely large major axis corresponding to the robot driving longitudinally along the pipe.

As shown in FIG. 6A, the contact point between the magnetic drive wheel and the ellipse is assumed to always occur along the ellipse's major axis. That is, as the vehicle follows a constant-pitch helical path on the pipe, it does not move along the periphery of the ellipse; rather, identical elliptical cross sections constantly occur at every point as the crawler moves. This is a naturally occurring phenomenon due to the fact that the drive wheel is magnetic and that it is designed to have two symmetrically separated contact points with the surface which effectively normalize the drive wheel in the roll direction relative to the surface.

Accordingly, in some implementations, a method for optimization of the four-bar linkage geometry can include defining the location of pivot-point P8. For instance, in reference to FIG. 4A, the location of P8 on the generally vertical plate of hinge 200 can be moved in one or more directions relative to P3 (e.g., down, forwards, rearwards etc.). Thus, altering the location of P8 defines the length of the link that extends between pivot points P8 and P5 as well as the effective length and orientation of link L7 (as shown in FIG. 5A) that extends between pivot-points P8 and P3. This exemplary approach assumes that every other dimension in the design is known or already defined. However, in some implementations, one or more of the other dimensions (e.g., the location of pivot-points P3, P4, P5 relative to the first chassis section and one-another) can also be changed for further iterative optimization as desired. Nonetheless, the adjustment of the location of point P8 (e.g., by altering the location of P8 on the hinge plate 200 as shown in FIG. 4A) can be an effective design adjustment. In particular, practical application indicates that final adjustment of point P8 to optimize the normalizing characteristics facilitates good design flow, as the other dimensions can generally be defined earlier in the design process using criteria such as, for example and without limitation, desired magnetic force, overall crawler size, range of pipe sizes to target, and the like.

More specifically, in some implementations, an exemplary process for defining a four-bar linkage having an optimized normalization characteristics can include the following steps.

Step 605, select a target pipe size. It is worth noting that although a target pipe size is preferable as an input, exemplary vehicles having four-bar linkages designed according to the disclosed embodiments can still achieve near perfect normalization even when the vehicle is used on a different pipe size than used to define the geometry of the four-bar linkage. As noted above, preferably, the geometric parameters of the robots components, aside from the particular location of P8, are preferably pre-defined.

Figure 6B:
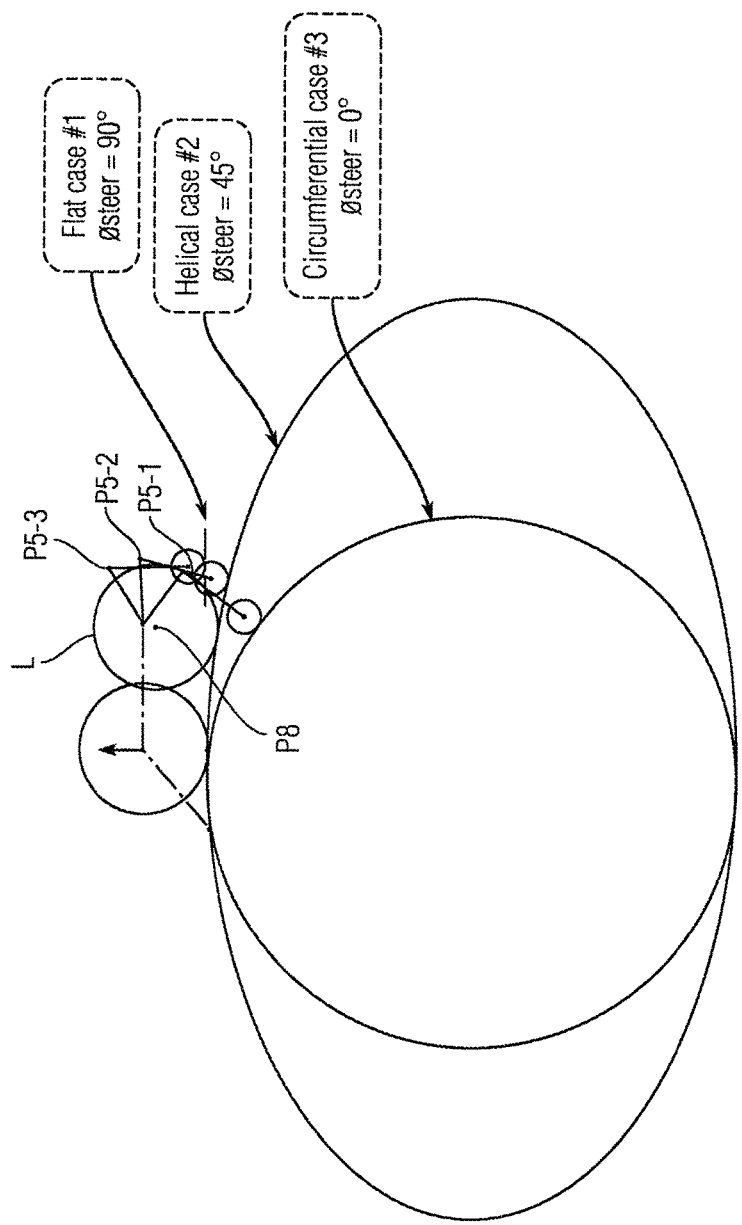
FIG. 6B is a simplified side-view conceptual schematic illustrating additional features of the vehicle of FIG. 1 in accordance with one or more disclosed embodiments.

Step 610, the configuration of the crawler on the pipe is modeled in the following three different cases: Case 1: Crawler driving longitudinally (i.e., lengthwise) along the pipe, in other words θsteer=90°; Case 2: Crawler driving helically, in other words θsteer=45° (alternatively other helical angles could be used except for 0 or 90°); and Case 3: Crawler driving circumferentially, in other words θsteer=0°. FIG. 6B illustrates the effective curvature of the surface of the pipe in each of the three cases.

Step 615, impose the following constraints on the aforementioned cases in order to fully define the configuration of the crawler on the pipe in each case: 1) Tangency between magnetic drive wheel and the pipe with a contact point occurring at the major axis of the ellipse; 2) Contact occurring between the front support point and the ellipse; and 3) Tangency between the follower wheel and the pipe with perfect normalization (e.g. perpendicularity between the pipe and the line running from P5 to P7). Imposing the constraints defined at step 715 will yield three different positions for point P5 relative to the chassis, as further illustrated in FIG. 6B. In particular FIG. 6B illustrates a simplified geometric model of a vehicle (e.g., vehicle 100) and the resulting location of pivot-point P5 in view of the constraints applied to cases 1, 2 and 3, namely, P5-1, P5-2, P5-3, respectively.

Step 620, determine the location of P8. In particular, the location of P8 can be determined to be the center of a circle C defined according to the three positions of P5 determined for the three cases at step 715 (e.g., P5-1, P5-2 and P5-3). Moreover, the length of the link from P8 to P5 can correspondingly be determined to be the radius of said circle. This circle C is shown in FIG. 6B in dotted line.

It should be understood that exemplary method and vehicle model described above is a simplified approximation of the action of the vehicle while traversing the surface. For instance, the model assumes that the drive wheel of the robot remains tangent to the ellipse whereas, in practice, the drive wheel does not always behave in this assumed way. More specifically, because the magnetic drive wheel can be configured to make contact with the pipe at two points (e.g., one point of contact for each spaced-apart yoke) which are both set-off of the longitudinal cross-sectional plane of the vehicle, the drive wheel can track closer to the centerline of the pipe while traveling helically when the convex shape of the pipe encroaches in between the wheel's yokes. An alternative model can be used show the drive wheel having an overlap with the ellipse in these helical cases, however, the simplified model nonetheless can yield suitably accurate results as is. It should be further appreciated that the model and methods for optimizing the four-bar linkage geometry described above are provided by way of example and without limitation and alternative methods and models can be implemented without departing from the scope of the disclosed embodiments.

Follower Wheel Assembly and Roll Joint

As noted, the follower wheel 138 of vehicle 100 can comprise an assembly that includes one or more wheels. FIG. 7A is a perspective view illustrating an exemplary configuration of such a follower wheel assembly 738 that can be attached to vehicle 100. In some implementations, the follower wheel assembly comprises a housing 700 for holding one or more passively rolling follower wheels. The housing 700 can be in the form of a U-shaped structure that has an open bottom. The housing 700 is thus defined by a pair of opposing side walls (left and right walls) 702 and top wall 704 extending therebetween. A hollow interior space is defined between the walls 702, 704.

In one non-limiting implementation of the present invention, in order to perform inspection of a surface being traversed (e.g., to ultrasonically measure the thickness of a pipe wall), the follower wheel assembly can include a wheeled sensor probe 710, which can be in the form of a dry coupled wheel probe (DCP). It should however be understood that, in other applications, different types of wheeled and non-wheeled sensors could be incorporated into the follower wheel assembly. In addition or alternatively, the follower wheel assembly 738 need not incorporate a rolling sensor at all and can simply comprise one or more passive rolling wheels. In such implementations, inspection devices such as optical and acoustic sensors can be mounted to other portions of the vehicle 100.

With respect to the exemplary DCP probe implementation, normal contact is preferably maintained between the traversed surface and the rolling wheel of such a sensor probe 710 because a dry coupled probe generally requires its internal transducer component to be normal to the inspected surface in order to acquire a clean measurement. Thus, in accordance with the present invention the joints comprising the rear-facing assembly 130 and the trailing wheel assembly itself can be configured to facilitate the passive normalization of the probe against the surface being traversed.

The sensor wheel 710 is rotatably disposed within the hollow interior space of the housing 700, with the sensor 710 being in the form of a wheel that rotates about an axle 701 that can extend between the side walls 702. The sensor 710 has a diameter and the side-walls 702 have a height such that when the sensor probe (wheel) 710 is rotatably coupled to the axle 701, a portion of the sensor probe 710 extends below a bottom edge of the side walls 702. The axle 701 can also support one or more and preferably two wheels (rollers) 720 that further allow the rear-facing mechanism 130 to roll across the surface 111 to allow inspection thereof. In the illustrated embodiment, the sensor probe (wheel) 710 is disposed between the pair of wheels 720. Similar to the magnetic drive wheel 116, the wheels 720 are preferably formed of a magnetic material to allow the rear-facing assembly 130 to attach to metal surface 111 and be movable thereacross in response to driving of the drive wheel 116. FIG. 7B is a perspective view of the wheeled sensor probe 710 and roller wheels 720 disposed on the axle 701 and without depicting the housing 700.

As noted, in some implementations, the housing 700 of the follower wheel assembly 738 can be rigidly attached to the second chassis section 114 such that the follow wheel assembly 738 does not move relative to the second chassis section 114. Alternatively, as noted, the follower wheel assembly can be connected to the second chassis section 114 by a roll joint 124. For instance, in an exemplary implementation shown in FIG. 7C, the housing 700 of the wheel assembly can be attached to the second chassis section 114 by way of a hinge 724 configured to allow the housing 700 and wheels 710, 720 to roll relative to the second chassis section 114 about the axis RA of the hinge. The hinge can be of several different types, including a knuckle/pin hinge or ball and detent hinge, for example.

Figure 8B:
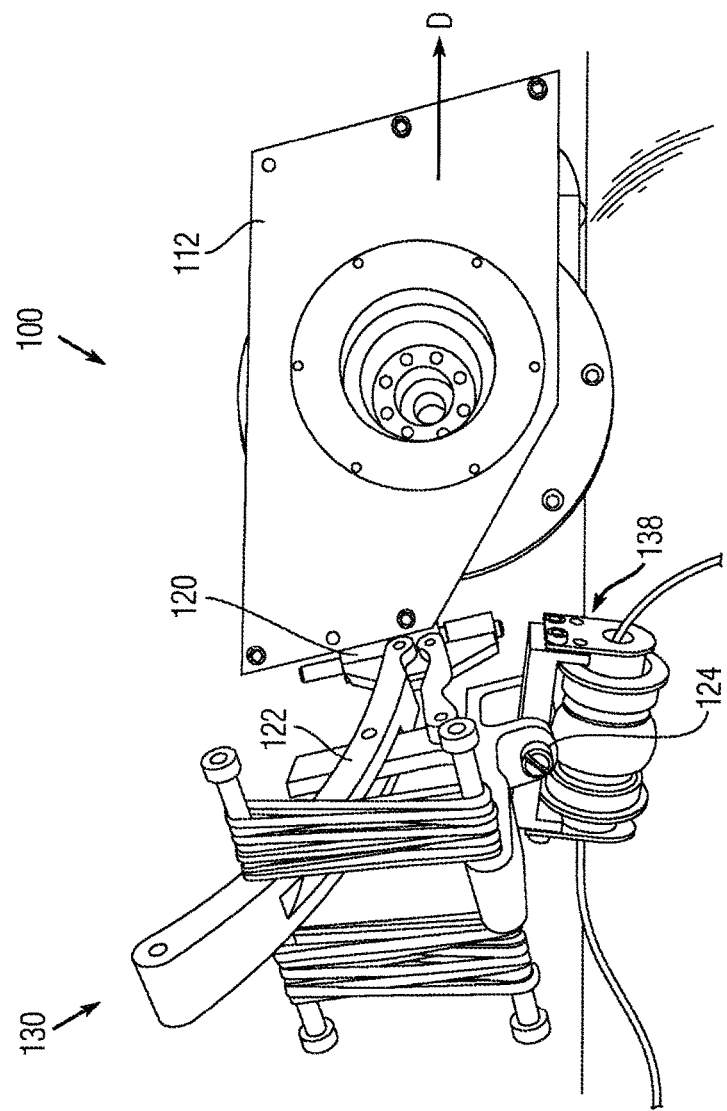
FIG. 8B is a rear perspective-view diagram illustrating additional features of the vehicle of FIG. 1 and follower wheel assembly of FIG. 7A in accordance with one or more disclosed embodiments.

In such an embodiment where a roll DoF is added to the follower wheel assembly for normalization purposes, it can be preferable to provide a follower wheel assembly providing at least two separate contact points with the target surface that are symmetrically disposed about the normalization line. For instance, as shown in FIGS. 7A-7C, two roller bearings wheels 720 can be symmetrically disposed about the central wheel probe 710, which is aligned with the normalization line 750. In practice, as the follower wheel assembly is lowered against a pipe, if one of the side wheels 720 contacts the surface before the other, the assembly can pivot about the roll joint 124 until the opposing side wheel contacts the surface effectively normalizing the probe wheel therebetween. FIG. 8A is a rear perspective view of the exemplary robot 100 maneuvering along a flat surface 711 and illustrates the roll DoF provided by the roll joint 124. As shown, the side wheels 720 form two contact points 755 with the surface 711, and the central probe wheel 710 provides a third contact point and is oriented normal to the surface along normal line 750. FIG. 8B is a rear perspective view of the exemplary robot 100 traversing along a curved pipe 750. As shown the rear-facing assembly 130 is pivoted to the side of the chassis about hinge 120, for instance, as if the vehicle 100 was previously traversing circumferentially about the pipe and then the first chassis section 112 was steered so as to continue traversing longitudinally along the length of the pipe. FIG. 8B further illustrates normalization of the follower wheel assembly on the pipe due to the combination of the pivot 120, four-bar linkage 122 and roll joint 124.

Sensor Configuration for Monitoring Orientation

In accordance with one or more embodiments of the invention, one or more sensors can be disposed on the robot 100 and configured to measure the orientation and other related characteristics of the robot 100 during operation. Exemplary systems and methods for calculating the orientation of a device are further described herein and in co-pending and commonly assigned U.S. Pat. No. 9,360,311 for "System and Method for Calculating the Orientation of a Device" to Gonzalez et. al. filed on Nov. 25, 2014, which is hereby incorporated by reference as if set forth in its entirety herein. More specifically, angular position sensors, such as encoders or potentiometers can be attached to one or more components of the rear-facing mechanism 130 and/or the first chassis section 112. The measurements captured using such sensors can be analyzed to continuously monitor the exact configuration of the rear-facing mechanism. In doing so, and assuming that the geometry of the traversed surface is known, the configuration of the rear mechanism could be used to determine the orientation of the crawler vehicle relative to the target surface. In some implementations, the determination of the device orientation can be determined online by a microcontroller mounted on the crawler, for example, the vehicle control module processor described in connection with FIG. 1. For instance, in the case of a crawler inspecting a pipe, if the pipe diameter is known, then the geometric configuration of the rear mechanism (e.g., the relative position of one or more of the components as measured in real time using the position sensors) can be used to determine whether the crawler is driving longitudinally, circumferentially or helically on the pipe (and even at which specific helical angle). Furthermore, again in the case of a vehicle inspecting a pipe, if the pipe diameter is not known, the vehicle can be configured to autonomously determine the pipe diameter by carrying out a predefined trajectory (such as for example a 360 rotation in place) and matching the motion profile of the rear mechanism to previously recorded motion profiles that are respectively associated with specific pipe diameters.

The vehicle 100 of the present invention provides a number of advantages not found in conventional products and overcomes the deficiencies associated with the prior art. More specifically, the following advantages are obtained with the apparatus of the present invention:

The disclosed embodiments provide a passive rear-facing apparatus that facilitates stability and general uprightness (i.e., a generally normal orientation relative to the surface) of certain key elements of the vehicle 100. In particular, the disclosed vehicle is designed to offer speed-independent stability and uprightness in a gravity-independent fashion on ferromagnetic surfaces over a wide range of surface curvatures. Whereas existing vehicle designs having only two points of contact with a surface at any point in time have inherent instability at low speeds, the disclosed vehicle generally maintains a minimum of three (3) major components simultaneously in contact with the surface being traversed, namely, the follower wheel, the driving wheel and the front support point, and is configured to do so over a wide range of surface curvatures. In addition, in configurations comprising a roll joint, a follower wheel including two symmetrically disposed contact points on the sides of the follower wheel and a magnetic drive wheel comprising two independently driven opposing yokes, the vehicle is configured to maintain as many as six points of contact during normal operation, namely, the front support, two contact points at the main drive wheel, the follower wheel and the two supporting wheels to the sides of the follower wheel. While the disclosed embodiments of the crawler are preferably configured to achieve normalization of the trailing wheel assembly at least while the rear-facing assembly is trailing the first chassis section during normal operation (e.g., while the rear-facing assembly is generally in-line with the front chassis section), it should be further understood that the trailing wheel assembly can, in certain circumstances, move out of a normal orientation relative to the surface. For instance, certain vehicle maneuvers such as hard steering and pivoting and the like can cause the rear assembly to swivel to the side of the front vehicle chassis and temporarily move out of the preferred normal orientation.

According to a salient aspect, the disclosed embodiments are generally configured to steer and drive using the drive wheel provided in the first chassis section. Although the rear-facing assembly of the vehicle is passively pulled by the drive wheel, the rear-facing assembly is designed such that it can swivel into a turn and, thus, facilitates steering and maneuverability of the vehicle. Accordingly, such a design can be considerably lighter and resultantly more compact than existing crawler designs, due to not having an independently steered rear-facing mechanism. As a result, smaller actuators can be used in view of the lighter weight, which is an important aspect when discussing climbing crawlers. The differential steering and maneuverability further allows the vehicle to achieve a high level of maneuverability and minimize any scratches or markings that could potentially be left by the crawler on the surface.

The design of the vehicle 100 also allows the vehicle to transverse very narrow surfaces (such as the side of a beam, very small pipe, etc.) due to its in-line configuration. The minimum width of such a surface is limited only by the inner distance between the two yokes of the magnetic driving wheel.

The magnetic pull force provided by the magnetic drive wheel and follower wheel further allows the vehicle to carry relatively heavy loads irrespective of gravity and orientation on the ferromagnetic surface.

It should be understood that various combination, alternatives and modifications of the present invention could be devised by those skilled in the art. The present invention is intended to embrace all such alternatives, modifications and variances that fall within the scope of the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been particularly shown and described with reference to a preferred embodiment thereof, it will be understood by those skilled in the art that various changes in form and details may be made therein without departing from the spirit and scope of the invention. Therefore, the scope of the invention is indicated by the appended claims, rather than by the foregoing description. All changes that come within the meaning and range of equivalency of the claims are to be embraced within their scope

What is claimed is:

1. A robotic vehicle for traversing a surface, comprising:
a first chassis section;
a drive wheel mounted to the first chassis section and configured to drive along the surface;
a front support point mounted to a bottom side of the first chassis section near a front end thereof;
a second chassis section;
a follower wheel assembly mounted to the second chassis section, the follower wheel assembly including a follower wheel configured to passively roll generally in a direction of travel of the vehicle along the surface;
a hinge joint connecting the first and second chassis sections such that the second chassis section is capable of rotation with respect to the first chassis section along a first path in at least a first direction, wherein the hinge joint is passive in nature and rotates in response to a curvature of the surface upon contact between at least a portion of the follower wheel assembly;
a four-bar linkage connecting the first and second chassis sections and configured to move the second chassis section with respect to the first chassis section along a second path in at least a second direction, wherein the four-bar linkage is passive in nature and automatically moves the second chassis section along the second path and wherein the combination of movement in the first direction and the second direction cause the follower wheel to remain in contact with the surface.

2. The robotic vehicle of claim 1, wherein movement in the first direction comprises a lateral movement of the second chassis section relative to the first chassis section along the first path and wherein movement in at least the second direction comprises a lifting of the second chassis section relative to the first chassis section along the second path, a lowering of the second chassis section relative to the first chassis section along the second path, or both.

3. The robotic vehicle of claim 2, wherein the four-bar linkage is configured such that the follower wheel assembly moves along a curved path as the follower wheel assembly makes contact with the surface.

4. The robotic vehicle of claim 1, further comprising:
a tension element configured to apply tension between at least two links defining the four-bar linkage and to provide a force that urges the second chassis section in at least the second direction and automatically adjusts a position of the second chassis section along the second path relative to the first chassis section as the curvature of the surface changes.

5. The robotic vehicle of claim 4, wherein the tension applied between the at least two links forces the front support into contact with the surface and provides a stabilizing force for the first chassis section relative to the surface.

6. The robotic vehicle of claim 1, the four-bar linkage comprises:
a first linkage plate that is oriented generally in a vertical direction relative to the bottom side of the first chassis section;
a second linkage plate that is spaced from the first linkage plate and oriented generally in the vertical direction;
a first connector arm pivotally connected to the first and second linkage plates; and
a second connector arm pivotally connected to the first and second linkage plates, wherein the first connector arm is located above the second connector arm in the vertical direction.

7. The robotic vehicle of claim 6, wherein at least a portion of the second chassis section defines the second linkage plate and wherein at least a portion of the hinge joint defines the first linkage plate,
wherein a tension element extends between at least two links defining the four-bar linkage and provides a force that urges the second chassis section relative to the surface in at least the pitch direction and automatically adjusts a position of the second chassis section along the second path relative to the first chassis section as the curvature of the surface changes.

8. The robotic vehicle of claim 6, further comprising:
a roll joint connecting the second chassis section to the follower wheel assembly, wherein the follower wheel assembly is capable of rotation with respect to the second chassis section about the roll joint and wherein the roll joint is passive in nature and is configured to automatically at least substantially normalize the follower wheel in a roll direction relative to the surface as the follower wheel assembly makes contact with the surface; and
wherein a location of the pivotal connection between the second connector arm and the first linkage plate is defined such that the vehicle meets prescribed constraints while traversing the surface of a pipe having a given diameter in each of a plurality of directions of travel along the surface of the pipe.

9. The robotic vehicle of claim 8, wherein the plurality of directions are, longitudinally along a length of the pipe, circumferentially about the pipe, and helically about the pipe.

10. The robotic vehicle of claim 9, wherein the constraints include maintaining tangency between the drive wheel and the pipe, maintaining contact between the front support point and the surface of the pipe, and maintaining tangency between the follower wheel and the pipe.

11. The robotic vehicle of claim 1, further comprising:
a roll joint connecting the second chassis section to the follower wheel assembly, wherein the follower wheel assembly is capable of rotation with respect to the second chassis section about the roll joint and wherein the roll joint is passive in nature and is configured to automatically at least substantially normalize the follower wheel in a roll direction relative to the surface as the follower wheel assembly makes contact with the surface.

12. The robotic vehicle of claim 1, wherein the hinge joint is coupled to the first chassis section and wherein the four-bar linkage is pivotally coupled to the hinge joint and the second chassis section.

13. The robotic vehicle of claim 1, wherein the four-bar linkage is pivotally coupled to the first chassis section and wherein the hinge joint is pivotally coupled to the four-bar linkage and coupled to the second chassis section.

14. The robotic vehicle of claim 1, wherein the surface is ferromagnetic, and further comprising:
at least a first magnet connected to at least the drive wheel, wherein the at least first magnet maintains an attractive force between the drive wheel and the surface.

15. The robotic vehicle of claim 14, further comprising at least a second magnet connected to the follower wheel, wherein the second magnet maintains an attractive force between the follower wheel and the surface.

16. The robotic vehicle of claim 1, wherein the drive wheel is a magnetic drive wheel and includes first and second coaxial spaced apart yokes, wherein the yokes maintain at least two points of contact between the drive wheel and the surface and wherein the yokes are configured to be driven independently with respect to each other.

17. The robotic vehicle of claim 1, wherein the follower wheel assembly comprises a rotatable sensor wheel that is mounted within a housing and is disposed between and coaxial to a pair of magnetic support wheels that are also rotatable within the housing, wherein the support wheels maintain at least two points of contact between the follower wheel assembly and the surface.

18. The robotic vehicle of claim 1, further comprising:
one or more angular position sensors attached to one or more of the first and second chassis sections; and
a processor configured to monitor the relative position of the first and second chassis sections using position measurements captured using said one or more sensors during vehicle operation and calculate one or more of: a) an orientation of the vehicle relative to the surface based on a known geometry of the surface, and b) measure the geometry of the surface based on the measurements captured using said one or more sensors during execution of a prescribed vehicle maneuver on the surface.

* * * * *